US012053930B2

(12) United States Patent
Sugai et al.

(10) Patent No.: US 12,053,930 B2
(45) Date of Patent: Aug. 6, 2024

(54) THREE-DIMENSIONAL OBJECT PRINTING METHOD AND THREE-DIMENSIONAL OBJECT PRINTER

(71) Applicant: Seiko Epson Corporation, Tokyo (JP)

(72) Inventors: Keigo Sugai, Chino (JP); Kenju Mochizuki, Azumino (JP)

(73) Assignee: SEIKO EPSON CORPORATION (JP)

( * ) Notice: Subject to any disclaimer, the term of this patent is extended or adjusted under 35 U.S.C. 154(b) by 127 days.

(21) Appl. No.: 17/692,270

(22) Filed: Mar. 11, 2022

(65) Prior Publication Data

US 2022/0288864 A1 Sep. 15, 2022

(30) Foreign Application Priority Data

Mar. 12, 2021 (JP) .................. 2021-040003

(51) Int. Cl.
*B33Y 10/00* (2015.01)
*B29C 64/209* (2017.01)
*B29C 64/393* (2017.01)
*B33Y 30/00* (2015.01)
*B33Y 50/02* (2015.01)
*B41J 2/21* (2006.01)
*B41J 3/407* (2006.01)

(52) U.S. Cl.
CPC .......... *B29C 64/393* (2017.08); *B29C 64/209* (2017.08); *B33Y 10/00* (2014.12); *B33Y 30/00* (2014.12); *B33Y 50/02* (2014.12); *B41J 2/2135* (2013.01); *B41J 3/4073* (2013.01)

(58) Field of Classification Search
None
See application file for complete search history.

(56) References Cited

U.S. PATENT DOCUMENTS

| 2002/0113830 A1* | 8/2002 | Mantell | B41J 2/2056 347/6 |
| 2008/0238966 A1* | 10/2008 | Nishihara | B41J 2/2128 347/11 |
| 2014/0063096 A1 | 3/2014 | Pitz et al. | |
| 2019/0030819 A1* | 1/2019 | Mantell | B29C 48/345 |
| 2019/0210287 A1* | 7/2019 | Newell | B29C 64/30 |
| 2020/0101736 A1 | 4/2020 | Satoh et al. | |

FOREIGN PATENT DOCUMENTS

| JP | 2014-050832 A | 3/2014 |
| JP | 2019-181797 A | 10/2019 |
| JP | 2020-055301 A | 4/2020 |

* cited by examiner

*Primary Examiner* — Erica S Lin
(74) *Attorney, Agent, or Firm* — Harness, Dickey & Pierce, P.L.C.

(57) ABSTRACT

A three-dimensional object printing method includes a first test printing step of printing a first test pattern in a first region of a workpiece by a head unit while a position of the head unit being changed by a robot, a first detection step of detecting the first test pattern, and a first printing step of printing a first pattern in the first region by the head unit based on a result detected in the first detection step while the position of the head unit being changed by the robot.

11 Claims, 13 Drawing Sheets

THREE-DIMENSIONAL OBJECT PRINTING METHOD AND THREE-DIMENSIONAL OBJECT PRINTER

The present application is based on, and claims priority from JP Application Serial Number 2021-040003, filed Mar. 12, 2021, the disclosure of which is hereby incorporated by reference herein in its entirety.

BACKGROUND

1. Technical Field

The present disclosure relates to a three-dimensional object printing method and a three-dimensional object printer.

2. Related Art

There has been known a three-dimensional object printer that performs ink jet printing on the surface of a three-dimensional workpiece. For example, a device described in JP-A-2014-050832 includes a robot arm and a print head fixed to the tip of the robot arm, and prints an image on an object with ink from the print head while operating a plurality of movable sections of the robot arm.

In the printer described in JP-A-2014-050832, a scanning speed or a posture around a pitch axis of the print head or other states by the robot arm deviate from a target state at various timings due to an operation error of movable sections of the robot arm. The device described in JP-A-2014-050832 has a problem that a landing position of the ink on the object deviates from a desired position due to such a deviation of the state of the print head, thus resulting in deterioration of image quality.

SUMMARY

A three-dimensional object printing method according to an aspect of the present disclosure is a three-dimensional object printing method for printing on a workpiece having a three-dimensional shape by using a head unit having a first nozzle array that discharges a liquid onto the workpiece and a robot that changes a position and a posture of the head unit relative to the workpiece. The three-dimensional object printing method includes a first test printing step of printing a first test pattern by the head unit discharging the liquid from the first nozzle array onto a first region of the workpiece or an object corresponding to the workpiece while the robot is changing the position of the head unit relative to the workpiece or the object, a first detection step of detecting the first test pattern, and a first printing step of printing a first pattern by the head unit discharging the liquid from the first nozzle array onto the first region based on a result detected in the first detection step while the robot is changing the position of the head unit relative to the workpiece.

A three-dimensional object printing method according to another aspect of the present disclosure is a three-dimensional object printing method for printing on a workpiece having a three-dimensional shape by using a head unit having a first nozzle array and a second nozzle array that discharge a liquid onto the workpiece and a robot that changes a position and a posture of the head unit relative to the workpiece. The three-dimensional object printing method includes a first test printing step of printing a first test pattern by the head unit discharging the liquid from the first nozzle array onto a first region of the workpiece or an object corresponding to the workpiece while the robot is changing the position of the head unit relative to the workpiece or the object, a second test printing step of printing a second test pattern by the head unit discharging the liquid from the second nozzle array onto the workpiece or the first region while the robot is changing the position of the head unit relative to the workpiece or the object, a first detection step of detecting the first test pattern, a second detection step of detecting the second test pattern, a first printing step of printing a first pattern by the head unit discharging the liquid from the first nozzle array onto the first region based on a result detected in the first detection step while the robot is changing the position of the head unit relative to the workpiece, and a second printing step of printing a second pattern by the head unit discharging the liquid from the second nozzle array onto the first region based on a result detected in the second detection step while the robot is changing the position of the head unit relative to the workpiece.

A three-dimensional object printer according to an aspect of the present disclosure includes a head unit having a first nozzle array that discharges a liquid onto a workpiece having a three-dimensional shape, a robot that changes a position and a posture of the head unit relative to the workpiece, and a detector that detects a test pattern printed on the workpiece or on an object corresponding to the workpiece. The three-dimensional object printer executes a first test printing step of printing a first test pattern by the head unit discharging the liquid from the first nozzle array onto a first region of the workpiece or the object while the robot is changing the position of the head unit relative to the workpiece or the object, a first detection step of detecting the first test pattern, and a first printing step of printing a first pattern by the head unit discharging the liquid from the first nozzle array onto the first region based on a result detected in the first detection step while the robot is changing the position of the head unit relative to the workpiece.

A three-dimensional object printer according to another aspect of the present disclosure includes a head unit having a first nozzle array and a second nozzle array that discharge a liquid onto a workpiece having a three-dimensional shape, a robot that changes a position and a posture of the head unit relative to the workpiece, and a detector that detects a test pattern printed on the workpiece or on an object corresponding to the workpiece. The three-dimensional object printer executes a first test printing step of printing a first test pattern by the head unit discharging the liquid from the first nozzle array onto a first region of the workpiece or the object while the robot is changing the position of the head unit relative to the workpiece or the object, a second test printing step of printing a second test pattern by the head unit discharging the liquid from the second nozzle array onto the workpiece or the first region while the robot is changing the position of the head unit relative to the workpiece or the object, a first detection step of detecting the first test pattern, a second detection step of detecting the second test pattern, a first printing step of printing a first pattern by the head unit discharging the liquid from the first nozzle array onto the first region based on a result detected in the first detection step while the robot is changing the position of the head unit relative to the workpiece, and a second printing step of printing a second pattern by the head unit discharging the liquid from the second nozzle array onto the first region based on a result detected in the second detection step while the robot is changing the position of the head unit relative to the workpiece.

DESCRIPTION OF EXEMPLARY EMBODIMENTS

Figure 1:
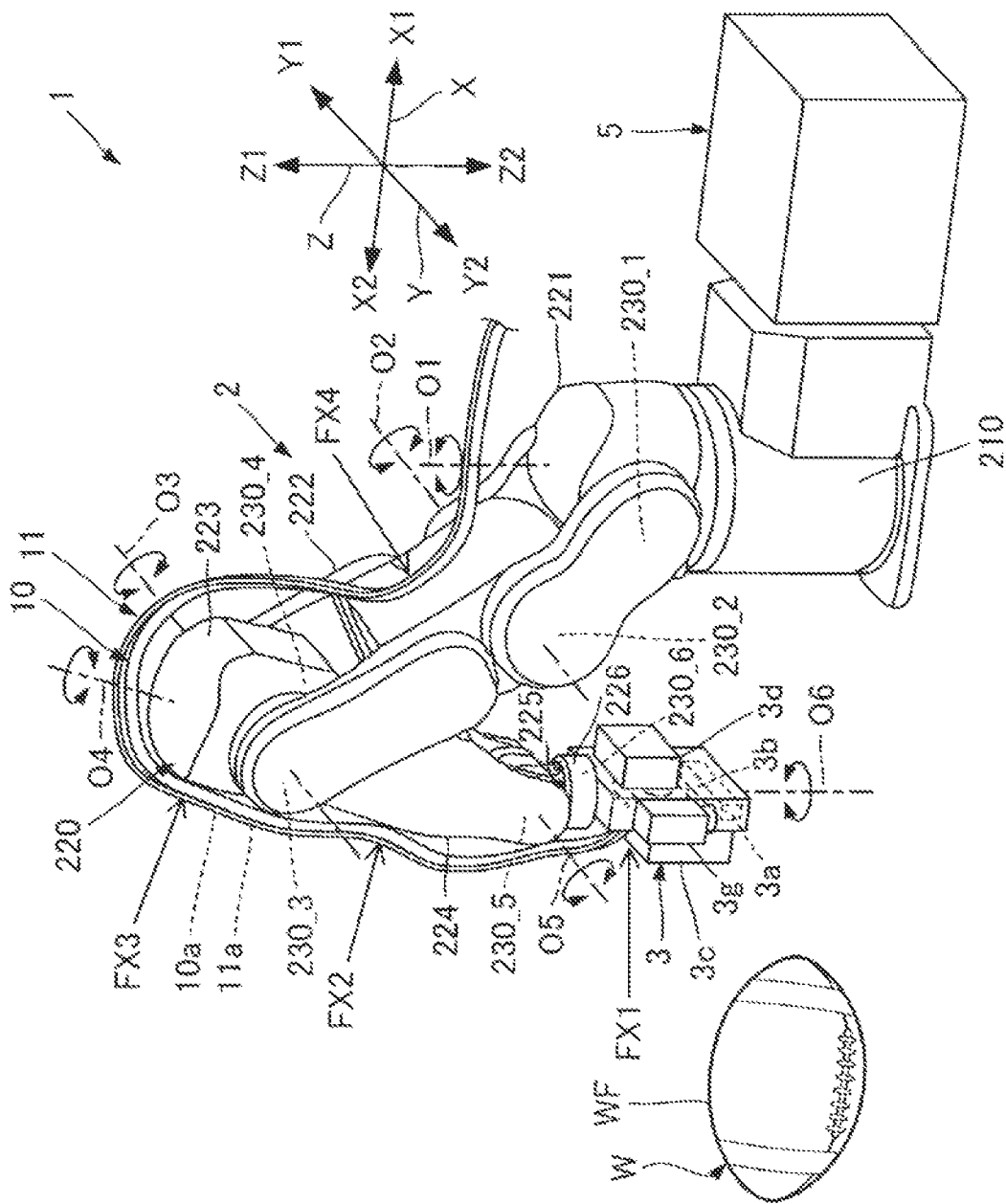
FIG. 1 is a perspective view schematically illustrating a three-dimensional object printer according to a first embodiment.

Hereinafter, embodiments according to the present disclosure will be described with reference to the accompanying drawings. In the drawings, the dimensions and scale of each component are appropriately different from the actual ones, and some parts are schematically illustrated for easy understanding. Furthermore, the scope of the present disclosure is not limited to such embodiments unless it is stated in the following description that the present disclosure is particularly limited.

For convenience, the following description will be given appropriately using an X-axis, a Y-axis and a Z-axis that intersect each other. Also, in the following description, one direction along the X-axis is an X1 direction, and a direction opposite to the X1 direction is an X2 direction. Likewise, directions opposite to each other along the Y-axis are a Y1 direction and a Y2 direction. Also, directions opposite to each other along the Z-axis are a Z1 direction and a Z2 direction.

The X-axis, Y-axis, and Z-axis correspond to coordinate axes of a world coordinate system set in a space where a robot 2 to be described later is installed. Typically, the Z-axis is a vertical axis, and the Z2 direction corresponds to a downward direction in the vertical direction. A base coordinate system based on a position of a base section 210 to be described later of the robot 2 is associated with the world coordinate system by calibration. In the following, for convenience, description is given of a case where the operation of the robot 2 is controlled by using the world coordinate system as a robot coordinate system.

The Z-axis does not have to be the vertical axis. The X-axis, Y-axis, and Z-axis are typically orthogonal to each other. However, the present disclosure is not limited thereto, and the X-axis, Y-axis, and Z-axis are not orthogonal to each other in some cases. For example, the X-axis, Y-axis, and Z-axis may intersect each other at an angle within a range from 80° to 100°.

1. FIRST EMBODIMENT

1-1. Overview of Three-Dimensional Object Printer

FIG. 1 is a perspective view schematically illustrating a three-dimensional object printer 1 according to a first embodiment. The three-dimensional object printer 1 performs ink jet printing on a surface of a workpiece W having a three-dimensional shape.

The workpiece W has a surface WF on which printing is performed. In the example illustrated in FIG. 1, the workpiece W is a rugby ball having a long spherical shape, and the surface WF is a curved surface. The workpiece W at the time of printing is supported by a structure such as a predetermined installation table, a robot hand, or a conveyor, when necessary. The aspect such as the shape or size of the workpiece W or the surface WF is not limited to the example illustrated in FIG. 1 but may be any size or shape. Likewise, the position or orientation of the workpiece W or the surface WF during printing is not limited to the example illustrated in FIG. 1 but may be any position or orientation that allows for printing.

As illustrated in FIG. 1, the three-dimensional object printer 1 includes the robot 2, a head unit 3, a controller 5, a piping section 10, and a wiring section 11. First, these components will be briefly described below in order.

The robot 2 is a robot that changes a position and a posture of the head unit 3 in the world coordinate system. In the example illustrated in FIG. 1, the robot 2 is a 6-axis vertical articulated robot.

As illustrated in FIG. 1, the robot 2 has the base section 210 and an arm section 220.

The base section 210 is a table that supports the arm section 220. In the example illustrated in FIG. 1, the base section 210 is fixed by screwing or the like to an installation surface such as a floor surface facing the Z1 direction. The installation surface to which the base section 210 is fixed may be a surface facing in any direction, and is not limited to the example illustrated in FIG. 1 but may be, for example, a surface of a wall, a ceiling, a movable trolley, or the like. In the following, viewing in a direction perpendicular to the installation surface of the base section 210, that is, viewing in the Z1 direction or Z2 direction may be referred to as "plan view of the base section 210" or simply "plan view" in this embodiment.

The arm section 220 is a 6-axis robot arm having a base end attached to the base section 210 and a tip that changes its position and posture three-dimensionally with respect to the base end. To be more specific, the arm section 220 has arms 221, 222, 223, 224, 225, and 226, which are coupled in this order.

The arm 221 is rotatably coupled to the base section 210 around a rotation axis O1 via a joint section 230_1. The arm 222 is rotatably coupled to the arm 221 around a rotation axis O2 via a joint section 230_2. The arm 223 is rotatably coupled to the arm 222 around a rotation axis O3 via a joint section 230_3. The arm 224 is rotatably coupled to the arm 223 around the rotation axis O4 via the joint section 230_4.

The arm 225 is rotatably coupled to the arm 224 around a rotation axis O5 via a joint section 230_5. The arm 226 is rotatably coupled to the arm 225 around a rotation axis O6 via a joint section 230_6.

Each of the joint sections 230_1 to 230_6 is a mechanism for rotatably coupling one of two adjacent members among the base section 210 and the arms 221 to 226 to the other. In the following, each of the joint sections 230_1 to 230_6 may be referred to as the "joint section 230".

Although not illustrated in FIG. 1, each of the joint sections 230_1 to 230_6 is provided with a drive mechanism to rotate one of the two corresponding members adjacent to each other with respect to the other. The drive mechanism includes, for example, a motor that generates driving force for the rotation, a speed reducer that decelerates and outputs the driving force, and an encoder such as a rotary encoder that detects an operating amount such as an angle of the rotation. The assembly of the drive mechanisms of the joint sections 230_1 to 230_6 corresponds to an arm drive mechanism 2a illustrated in FIG. 2 to be described later.

The rotation axis O1 is an axis perpendicular to the installation surface (not shown) to which the base section 210 is fixed. The rotation axis O2 is an axis perpendicular to the rotation axis O1. The rotation axis O3 is an axis parallel to the rotation axis O2. The rotation axis O4 is an axis perpendicular to the rotation axis O3. The rotation axis O5 is an axis perpendicular to the rotation axis O4. The rotation axis O6 is an axis perpendicular to the rotation axis O5.

Regarding these rotation axes, "perpendicular" includes not only when the angle formed by any two rotation axes is exactly 90°, but also when the angle formed by any two rotation axes deviates from 90° by about ±5°. Likewise, "parallel" includes not only when any two rotation axes are strictly parallel, but also when one of any two rotation axes is tilted within a range of about ±5° with respect to the other.

The head unit 3 is attached, as an end effector, to the arm 226 located at the tip of the arm section 220 of the robot 2 in a state where the head unit 3 is fixed by screwing or the like.

The head unit 3 is an assembly having a head 3a that discharges ink, which is an example of a "liquid", toward the workpiece W. In this embodiment, the head unit 3 includes, besides the head 3a, a pressure regulating valve 3b, a curing light source 3c, a distance sensor 3d, and an imaging device 3g. The head unit 3 will be described in detail with reference to FIG. 3 to be described later.

The ink is not particularly limited, and examples of the ink include an aqueous ink having a coloring material such as a dye or a pigment dissolved in an aqueous solvent, a curable ink using a curable resin such as an ultraviolet curable type, and a solvent-based ink having a coloring material such as a dye or a pigment dissolved in an organic solvent, and the like. Among the above, the curable ink is preferably used. The curable ink is not particularly limited but may be, for example, any of a thermosetting type, a photocurable type, a radiation curable type, an electron beam curable type, and the like. Among the above, the photocurable type such as an ultraviolet curable type is preferable. The ink is not limited to a solution but may be an ink having a coloring material or the like dispersed as a dispersoid in a dispersion medium. Alternatively, the ink is not limited to that containing a coloring material but may be an ink containing conductive particles such as metal particles for forming a wire or the like as a dispersoid, a clear ink, or a treatment liquid for surface treatment of the workpiece W.

The piping section 10 and the wiring section 11 are coupled to the head unit 3, respectively. The piping section 10 is a piping or a piping group including a supply pipe 10a that supplies ink from an ink tank (not shown) to the head unit 3. The supply pipe 10a is a flexible pipe body made of, for example, a rubber material, an elastomer material, or the like. The wiring section 11 is a wire or a wiring group including a drive wire 11a for supplying an electric signal to drive the head 3a. The drive wire 11a is made of various flexible electrical wires, for example. In addition to the supply pipe 10a, the piping section 10 may also include other pipes such as a pipe for transferring ink discharged from the head unit 3. In addition to the drive wire 11a, the wiring section 11 appropriately includes various wires for transmitting other electronic signals such as a control signal SI to be described later, which are required for the operation of the head unit 3, for example.

The piping section 10 and the wiring section 11 are fixed to the head unit 3 at a fixing position FX1 by coupling to the head unit 3. The fixing position FX1 is a position inside the end effector, specifically, a position of a connector (not shown) for coupling the piping section 10 and the wiring section 11 to the head unit 3. The piping section 10 and the wiring section 11 are also fixed to the arm section 220 of the robot 2 described above by a binding band or the like at fixing positions FX2, FX3, and FX4. The fixing position FX2 is a position on the arm 224 described above. The fixing position FX3 is a position on the arm 223 described above. The fixed position FX4 is a position on the arm 222 described above. By partially fixing the piping section 10 and the wiring section 11 at the plurality of positions of the arm section 220 as described above, the positional relationship between the arm section 220 and the piping section 10 and the wiring section 11 can be maintained within a predetermined range while sufficiently allowing the movement of the arm section 220. Although FIG. 1 illustrates a configuration where the piping section 10 and the wiring section 11 are routed through the same path, the paths through which the piping section 10 and the wiring section 11 are routed may be partially different from each other. Also, the fixing positions of the piping section 10 and the wiring section 11 with respect to the robot 2 are not limited to those in the example illustrated in FIG. 1, but are optionally selected.

The controller 5 is a robot controller that controls the drive of the robot 2. The controller 5 will be described in detail in the following description of the electrical configuration of the three-dimensional object printer 1.

1-2. Electrical Configuration of Three-Dimensional Object Printer

Figure 2:
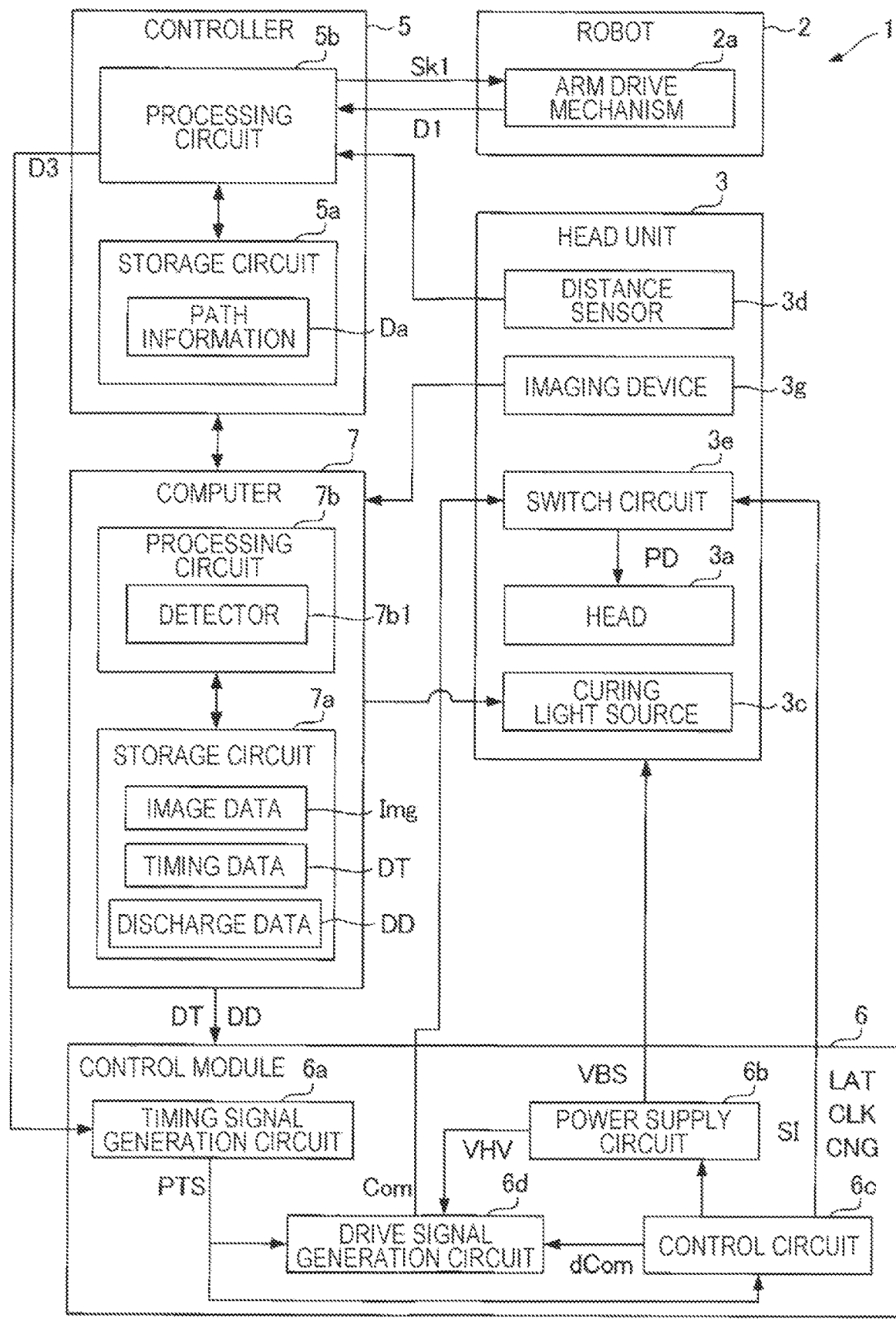
FIG. 2 is a block diagram illustrating an electrical configuration of the three-dimensional object printer according to the first embodiment.

FIG. 2 is a block diagram illustrating an electrical configuration of the three-dimensional object printer 1 according to the first embodiment. FIG. 2 illustrates electrical components among the components of the three-dimensional object printer 1. As illustrated in FIG. 2, the three-dimensional object printer 1 includes, in addition to the components illustrated in FIG. 1 described above, a control module 6 communicably coupled to the controller 5 and a computer 7 communicably coupled to the controller 5 and to the control module 6. Hereinafter, prior to the detailed description of the controller 5, the control module 6 and the computer 7 will be described in order.

Each of the electrical components illustrated in FIG. 2 may be appropriately divided, may be partially included in other components, or may be integrally configured with other components. For example, a part or all of the functions of the controller 5 or the control module 6 may be realized by the computer 7, or may be realized by another external device such as a personal computer (PC) coupled to the controller 5 via a network such as a local area network (LAN) or the Internet. Also, a part or all of the functions of the computer 7 may be realized by the controller 5 or the control module 6.

The controller 5 has a function to control the drive of the robot 2 and a function to generate a signal D3 for synchronizing an ink discharge operation in the head unit 3 with the operation of the robot 2.

The controller 5 includes a storage circuit 5a and a processing circuit 5b.

The storage circuit 5a stores various programs to be executed by the processing circuit 5b and various data to be processed by the processing circuit 5b. The storage circuit 5a includes, for example, one or both of semiconductor memories including a volatile memory such as a random access memory (RAM) and a non-volatile memory such as a read only memory (ROM), an electrically erasable programmable read-only memory (EEPROM), or a programmable ROM (PROM). A part or all of the storage circuit 5a may be included in the processing circuit 5b.

The storage circuit 5a stores path information Da. The path information Da is information indicating a path to be taken by the head unit 3 and the posture of the head unit 3 on the path, and includes information regarding a scanning path RU_1 and a scanning path RU_2 to be described later. The path information Da is determined based on, for example, the shape of the workpiece W, and is expressed using the coordinate values of the base coordinate system or the world coordinate system. The shape of the workpiece W is obtained, for example, by CAD (computer-aided design) data indicating the three-dimensional shape of the workpiece W. Such path information Da is inputted from the computer 7 to the storage circuit 5a.

The processing circuit 5b controls the operation of the arm drive mechanism 2a of the robot 2 based on the path information Da, and also generates the signal D3. The processing circuit 5b includes, for example, one or more processors such as a central processing unit (CPU). The processing circuit 5b may include a programmable logic device such as a field-programmable gate array (FPGA) in place of or in addition to the CPU.

The arm drive mechanism 2a is an assembly of the drive mechanisms of the joint sections 230_1 to 230_6 described above and includes, for each joint section, a motor for driving the joint section of the robot 2 and an encoder that detects a rotation angle of the joint section of the robot 2.

The processing circuit 5b performs inverse kinematics calculation, which is a calculation for converting the path information Da into a movement amount such as a rotation angle and a rotation speed of each joint of the robot 2. The processing circuit 5b outputs a control signal Ski based on an output D1 from each encoder of the arm drive mechanism 2a so that the actual movement amount such as the rotation angle and rotation speed of each joint is obtained as a result of the calculation described above based on the path information Da. The control signal Ski controls the drive of the motor of the arm drive mechanism 2a. The control signal Ski is corrected by the processing circuit 5b based on the output from the distance sensor 3d, when necessary.

The processing circuit 5b also generates the signal D3 based on the output D1 from at least one of the plurality of encoders of the arm drive mechanism 2a. For example, the processing circuit 5b generates, as the signal D3, a trigger signal including a pulse at a timing when the output D1 from one of the plurality of encoders takes a predetermined value.

The control module 6 is a circuit that controls the ink discharge operation in the head unit 3 based on the signal D3 outputted from the controller 5 and discharge data DD from the computer 7. The control module 6 controls the ink discharge operation in the head unit 3 by appropriately using timing data DT from the computer 7 in addition to the signal D3 and the discharge data DD.

The control module 6 includes a timing signal generation circuit 6a, a power supply circuit 6b, a control circuit 6c, and a drive signal generation circuit 6d.

The timing signal generation circuit 6a generates a timing signal PTS based on the signal D3. The timing signal generation circuit 6a corrects the timing signal PTS by appropriately using the timing data DT in addition to the signal D3. This correction will be described with reference to FIG. 4 to be described later.

The power supply circuit 6b receives power from a commercial power source (not shown) and generates various predetermined potentials. The various potentials generated are appropriately supplied to each part of the control module 6 and the head unit 3. For example, the power supply circuit 6b generates a power supply potential VHV and an offset potential VBS. The offset potential VBS is supplied to the head unit 3. The power supply potential VHV is supplied to the drive signal generation circuit 6d.

The control circuit 6c generates, based on the timing signal PTS, a control signal SI, a waveform designation signal dCom, a latch signal LAT, a clock signal CLK, and a change signal CNG. These signals are synchronized with the timing signal PTS. Among these signals, the waveform designation signal dCom is inputted to the drive signal generation circuit 6d, and the other signals are inputted to the switch circuit 3e in the head unit 3.

The control signal SI is a digital signal for specifying an operating state of a drive element included in the head 3a of the head unit 3. To be more specific, the control signal SI specifies whether to supply a drive signal Com to be described later to the drive element. This specification determines, for example, whether to discharge ink from a nozzle corresponding to the drive element and also determines the amount of ink discharged from the nozzle. The waveform designation signal dCom is a digital signal for specifying the waveform of the drive signal Com. The latch signal LAT and the change signal CNG are used in combination with the control signal SI, and the drive timing of the drive element is defined to specify the ink discharge timing from the nozzle. The clock signal CLK is a reference clock signal synchronized with the timing signal PTS.

The control circuit 6c described above includes, for example, one or more processors such as a central processing unit (CPU). The control circuit 6c may include a programmable logic device such as a field-programmable gate array (FPGA) in place of or in addition to the CPU.

The drive signal generation circuit 6d is a circuit that generates a drive signal Com for driving each drive element included in the head 3a of the head unit 3. To be more specific, the drive signal generation circuit 6d has a DA conversion circuit and an amplifier circuit, for example. In the drive signal generation circuit 6d, the DA conversion circuit converts the waveform designation signal dCom from the control circuit 6c from a digital signal to an analog signal, and the amplifier circuit uses the power supply potential VHV from the power supply circuit 6b to amplify the analog signal. Thus, the drive signal Com is generated. Among the waveforms included in the drive signal Com, a signal having the waveform actually supplied to the drive element is a drive pulse PD. The drive pulse PD is supplied to the drive element from the drive signal generation circuit 6d via the switch circuit 3e in the head unit 3.

The switch circuit 3e is a circuit that switches, based on the control signal SI, whether to supply at least part of the waveform included in the drive signal Com as the drive pulse PD.

The computer 7 has a function to supply information such as the path information Da to the controller 5 and a function to supply information such as the discharge data DD and the timing data DT to the control module 6. The computer 7 of this embodiment has, besides these functions, a function to control the drive of the curing light source 3c, a function to detect a landing position of the ink based on an imaging result from the imaging device 3g, and a function to generate the timing data DT based on the detection result.

The computer 7 includes a storage circuit 7a and a processing circuit 7b.

The storage circuit 7a stores various programs executed by the processing circuit 7b and various data processed by the processing circuit 7b. The storage circuit 7a includes, for example, one or both semiconductor memories including a volatile memory such as a RAM and a non-volatile memory such as a ROM, an EEPROM or a PROM. A part or all of the storage circuit 7a may be included in the processing circuit 7b.

Image data Img, timing data DT, and discharge data DD are stored in the storage circuit 7a.

The image data Img is image data related to an image to be printed by the three-dimensional object printer 1. The image data Img is, for example, file format data or various vector format data or raster format data in a page description language such as PostScript, PDF (Portable Document Format), and XPS (XML Paper Specification) created by image editing software. In this embodiment, the image data Img contains information about a first test pattern PT1, a second test pattern PT2, a first pattern P1, and a second pattern P2, which will be described later.

The discharge data DD is image data in a format suitable for printing processing by the three-dimensional object printer 1. The discharge data DD is obtained, for example, by the processing circuit 7b converting the image data Img through processing such as rasterization processing. The discharge data DD includes a plurality of pixel data corresponding to the number of pixels of the printing resolution, as information indicating discharge conditions such as whether to discharge ink for each pixel.

The timing data DT is information for correcting the timing of the timing signal PTS described above, and is generated based on the detection result from a detector 7b1 to be described later. For example, the timing data DT is information indicating a correction value of ink discharge timing for each pixel.

The processing circuit 7b detects the landing position of the ink based on the imaging result from the imaging device 3g, and generates the timing data DT based on the detection result. The processing circuit 7b includes, for example, one or more processors such as a CPU. The processing circuit 7b may include a programmable logic device such as an FPGA in place of or in addition to the CPU.

The processing circuit 7b functions as the detector 7b1 by executing a program read from the storage circuit 7a. The detector 7b1 detects the first test pattern PT1 or the second test pattern PT2 to be described later by detecting the ink landing position based on the imaging result from the imaging device 3g.

1-3. Head Unit Configuration

Figure 3:
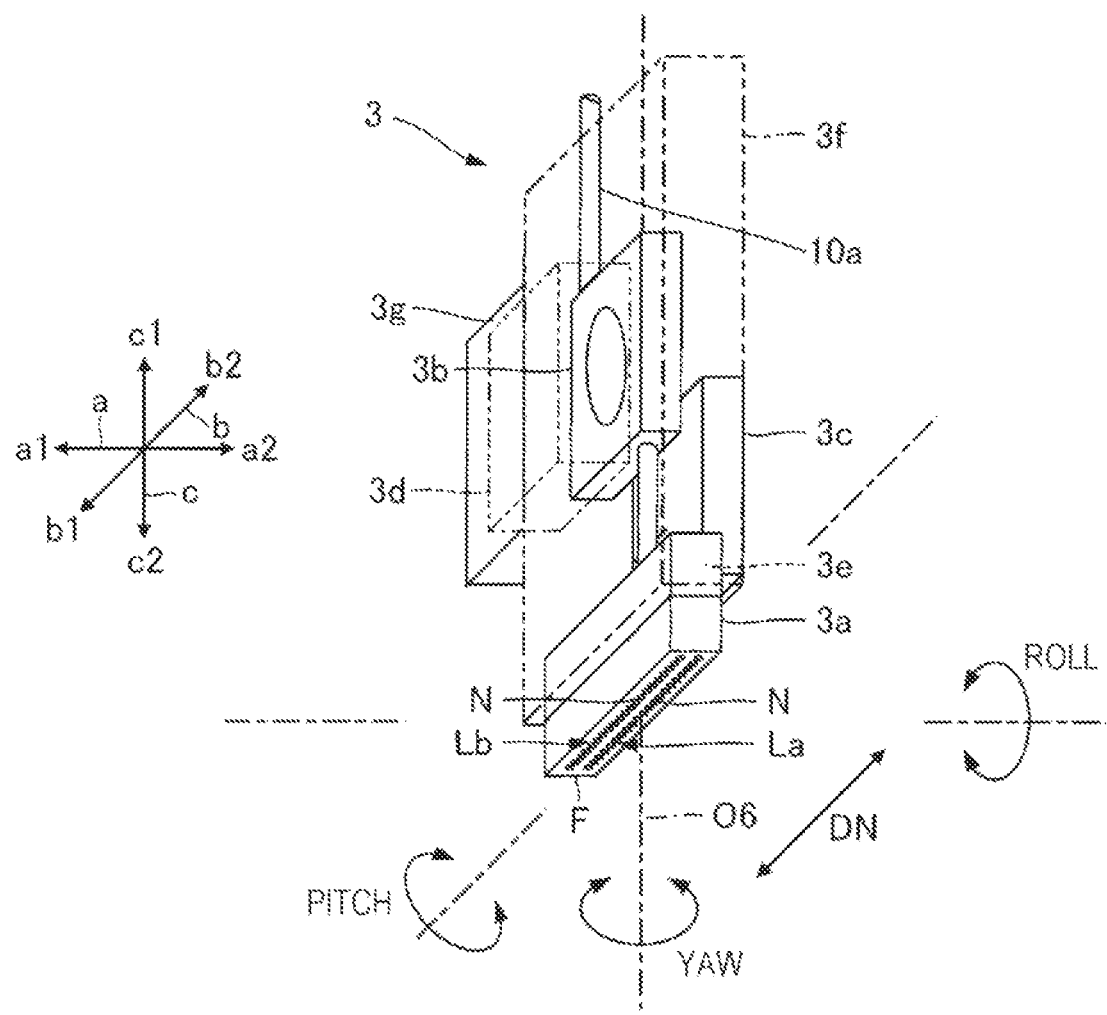
FIG. 3 is a perspective view illustrating a schematic configuration of a head unit.

FIG. 3 is a perspective view illustrating a schematic configuration of the head unit 3. For convenience, the following description will be given appropriately using an a-axis, a b-axis and a c-axis that intersect each other. In the following description, one direction along the a-axis is an a1 direction, and a direction opposite to the a1 direction is an a2 direction. Likewise, directions opposite to each other along the b-axis are a b1 direction and a b2 direction. Also, directions opposite to each other along the c-axis are a c1 direction and a c2 direction.

The a-axis, the b-axis, and the c-axis correspond to coordinate axes of a tool coordinate system set in the head unit 3. The relationships between positions and postures change relative to the world coordinate system or robot coordinate system described above according to the operation of the robot 2 described above. In the example illustrated in FIG. 3, the c-axis is parallel to the rotation axis O6 described above, and the head 3a discharges ink droplets in the c2 direction under ideal conditions. Therefore, the c2 direction may also be expressed as a discharge direction. The a-axis, b-axis, and c-axis are typically orthogonal to each other, but the present disclosure is not limited thereto and the axes may intersect at an angle within a range from 80° to 100°, for example. The tool coordinate system and the base coordinate system or the robot coordinate system are associated with each other by calibration. The tool coordinate system is set so that the center of a nozzle surface F to be described later serves as a reference (tool center point), for example.

As described above, the head unit 3 includes the head 3a, the pressure regulating valve 3b, the curing light source 3c, the distance sensor 3d, and the imaging device 3g. These are supported by a support 3f indicated by the chain double-dashed line in FIG. 3. In the example illustrated in FIG. 3, the head unit 3 includes one head 3a and one pressure regulating valve 3b. However, the present disclosure is not limited to the example illustrated in FIG. 3, and the head unit 3 may include two or more heads and valves. Also, the installation position of the pressure regulating valve 3b is not limited to the arm 226, but may be another arm, for example, or the like, or may be a fixed position with respect to the base section 210.

The support 3f is made of a metal material, for example, and is a substantially rigid body. In FIG. 3, the support 3f has a flat box shape, but the shape of the support 3f is not particularly limited and is optionally selected.

The support 3f is attached to the arm 226 described above. Therefore, the head 3a, the pressure regulating valve 3b, the curing light source 3c, the distance sensor 3d, and the imaging device 3g are collectively supported on the arm 226 by the support 3f. Thus, the relative positions of the head 3a, the pressure regulating valve 3b, the curing light source 3c, the distance sensor 3d, and the imaging device 3g with respect to the arm 226 are fixed. In the example illustrated in FIG. 3, the pressure regulating valve 3b is arranged at a position in the c1 direction with respect to the head 3a. The curing light source 3c is arranged at a position in the a2 direction with respect to the head 3a. The distance sensor 3d is arranged at a position in the a1 direction with respect to the head 3a. The imaging device 3g is arranged at a position in the b1 direction with respect to the head 3a.

The head 3a has a nozzle surface F and a plurality of nozzles N that open to the nozzle surface F. In the example illustrated in FIG. 3, a direction normal to the nozzle surface F is the c2 direction, and the plurality of nozzles N are divided into a nozzle array La and a nozzle array Lb, which are arranged with a space therebetween in a direction along the a-axis. Each of the nozzle arrays La and Lb is a set of the plurality of nozzles N linearly arranged in a direction along the b-axis. In the head 3a, the elements related to the nozzles N in the nozzle array La and the elements related to the nozzles N in the nozzle array Lb are configured to be substantially symmetrical to each other in the direction along the a-axis.

However, positions of the plurality of nozzles N in the nozzle array La and positions of the plurality of nozzles N in the nozzle array Lb may correspond to each other or may be different from each other in the direction along the b-axis. Also, the elements related to the nozzles N in one of the nozzle arrays La and Lb may be omitted. The following description is given of a configuration where the positions of the plurality of nozzles N in the nozzle array La and the positions of the plurality of nozzles N in the nozzle array Lb correspond to each other in the direction along the b-axis.

Although not illustrated, the head 3a has, for each nozzle N, a piezoelectric element as a drive element and a cavity for accommodating ink. The piezoelectric element causes ink to be discharged from the nozzle corresponding to the cavity by changing the pressure in the cavity corresponding to the piezoelectric element. Such a head 3a may be obtained, for example, by attaching a plurality of substrates such as a silicon substrate appropriately processed by etching or the like with an adhesive or the like. As the drive element for discharging ink from the nozzles, a heater that heats the ink inside the cavity may be used instead of the piezoelectric element.

As described above, ink is supplied to the head 3a from an ink tank (not shown) via the supply pipe 10a. A pressure regulating valve 3b is interposed between the supply pipe 10a and the head 3a.

The pressure regulating valve 3b is a valve mechanism that opens and closes according to the pressure of the ink in the head 3a. This opening and closing maintains the pressure of the ink in the head 3a at a negative pressure within a predetermined range even when the positional relationship between the head 3a and the ink tank (not shown) described above changes. Therefore, the meniscus of the ink formed in the nozzle N of the head 3a is stabilized. As a result, it is possible to prevent air bubbles from entering the nozzle N and the ink from overflowing from the nozzle N. The ink from the pressure regulating valve 3b is appropriately distributed to a plurality of locations in the head 3a via branch flow paths (not shown). The ink from the ink tank (not shown) is transferred into the supply pipe 10a at a predetermined pressure by a pump or the like.

The curing light source 3c emits energy such as light, heat, electron beams, or radiation for curing or solidifying the ink on the workpiece W. For example, when the ink is ultraviolet curable, the curing light source 3c includes a light emitting element such as a light emitting diode (LED) that emits ultraviolet rays. The curing light source 3c may appropriately include an optical component such as a lens for adjusting an emission direction or emission range of energy.

The curing light source 3c does not have to completely cure or completely solidify the ink on the workpiece W. In this case, for example, the ink irradiated with energy from the curing light source 3c may be completely cured or completely solidified by energy from a curing light source separately installed on the installation surface of the base section 210 of the robot 2. The curing light source 3c may be provided as needed and may be omitted.

The distance sensor 3d is an optical displacement sensor that measures a distance between the head 3a and the workpiece W. The distance sensor 3d of this embodiment outputs a signal according to the distance between the head 3a and the workpiece W in the direction along the c-axis. The distance sensor 3d may be provided as needed or may be omitted.

The imaging device 3g is a camera for taking an image of a test pattern printed on the workpiece W or an object O corresponding to the workpiece W. The imaging device 3g includes an imaging optical system and an imaging element. The imaging optical system is an optical system including at least one imaging lens, and may include various optical elements such as a prism, or may include a zoom lens, a focus lens, or the like. The imaging element is, for example, a CCD (Charge Coupled Device) image sensor, a CMOS (Complementary Metal Oxide Semiconductor) image sensor, or the like. The imaging device 3g has a rectangular pixel region including a plurality of pixels of the imaging element, and is arranged so that the longitudinal direction of the pixel region is parallel to the arrangement direction of the plurality of nozzles N described above. For the imaging device 3g, a two-axis or three-axis imaging coordinate system is set, which is based on the position of any pixel in the pixel region. This imaging coordinate system is associated with the base coordinate system or world coordinate system described above by calibration. The imaging device 3g may also include a lighting unit that illuminates the imaging region, when necessary, besides the imaging optical system and the imaging element. The lighting unit is, for example, a light source including a light emitting element such as a light emitting diode (LED), for example.

1-4. Timing Signal Correction

Figure 4:
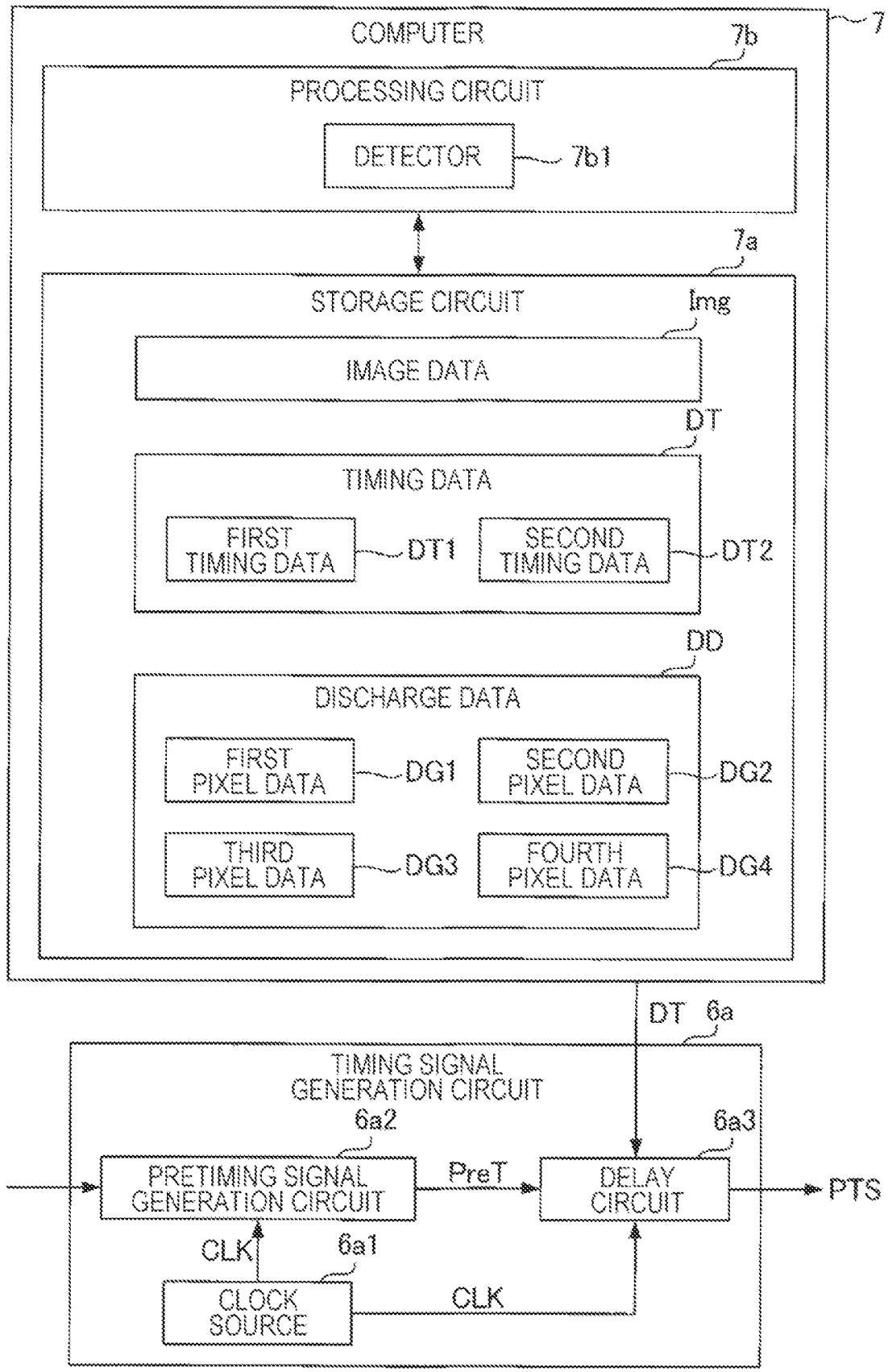
FIG. 4 is a diagram for explaining correction of a timing signal in the first embodiment.

FIG. 4 is a diagram for explaining correction of the timing signal PTS. As illustrated in FIG. 4, the timing signal generation circuit 6a includes a clock source 6a1, a pretiming signal generation circuit 6a2, and a delay circuit 6a3.

The clock source 6a1 is an oscillator such as a crystal oscillator that outputs a clock signal CLK of a certain frequency. A specific frequency of the clock signal CLK is determined according to the printing speed, the printing resolution, and the like, and is not particularly limited, but is 5 kHz to 1000 kHz, preferably 10 KHz to 100 kHz, for example. When the frequency is excessively low, the accuracy of correction of the timing signal PTS by the delay circuit 6a3 to be described later is likely to be reduced depending on the printing speed, printing resolution, or the like. On the other hand, when the frequency is excessively high, not only the accuracy of the correction cannot be further improved, but also the cost and power consumption of the timing signal generation circuit 6a are increased.

The pretiming signal generation circuit 6a2 generates a pretiming signal PreT based on the clock signal CLK and the signal D3 from the controller 5. More specifically, the pretiming signal generation circuit 6a2 is a timer that generates a pulse for each predetermined number of clocks of the clock signal CLK, and generates the pretiming signal PreT synchronized with the signal D3 by starting the operation triggered by the detection of the signal D3. The frequency of the pretiming signal PreT is lower than the frequency of the clock signal CLK, and is preferably ¹⁄₁₀₀ to ⅓, more preferably ¹⁄₂₀ to ⅕ of the frequency of the clock signal CLK.

The delay circuit 6a3 generates a timing signal PTS based on the pretiming signal PreT, the timing data DT from the computer 7, and the clock signal CLK. To be more specific, the delay circuit 6a3 is a timer that generates a pulse for each predetermined number of clocks of the clock signal CLK based on each pulse of the pretiming signal PreT, and generates a timing signal PTS delayed from the pretiming signal PreT. The predetermined number of clocks changes based on the timing data DT. That is, a delay time of the timing signal PTS with respect to the pretiming signal PreT by the delay circuit 6a3 changes based on the timing data DT.

As illustrated in FIG. 4, the timing data DT includes the first timing data DT1 and the second timing data DT2. The first timing data DT1 is data related to the delay time of the timing signal PTS with respect to the pretiming signal PreT in a first printing step to be described later, and is generated based on a detection result from the detector 7b1 in a first detection step to be described later. The second timing data DT2 is data related to the delay time of the timing signal PTS with respect to the pretiming signal PreT in a second printing step to be described later, and is generated based on a detection result from the detector 7b1 in a second detection step to be described later.

The discharge data DD includes a plurality of pixel data as described above, and the plurality of pixel data include first pixel data DG1, second pixel data DG2, third pixel data DG3, and fourth pixel data DG4.

The first pixel data DG1 and the second pixel data DG2 are any two pieces of pixel data related to pixels corresponding to different positions in the scanning direction of the head unit 3 with respect to the workpiece W in the first printing step to be described later among the plurality of pixel data included in the discharge data DD.

The third pixel data DG3 and the fourth pixel data DG4 are any two pieces of pixel data related to pixels corresponding to different positions in the scanning direction of the head unit 3 with respect to the workpiece W in the second printing step to be described later among the plurality of pixel data included in the discharge data DD.

The first pixel data DG1 and the third pixel data DG3 are data related to pixels corresponding to the same position in the scanning direction of the head unit 3 with respect to the workpiece W. The second pixel data DG2 and the fourth pixel data DG4 are data related to pixels corresponding to the same position in the scanning direction of the head unit 3 with respect to the workpiece W.

The timing to discharge ink from the nozzles N based on each of the plurality of pixel data included in the discharge data DD is determined by the timing signal PTS.

Figure 5:
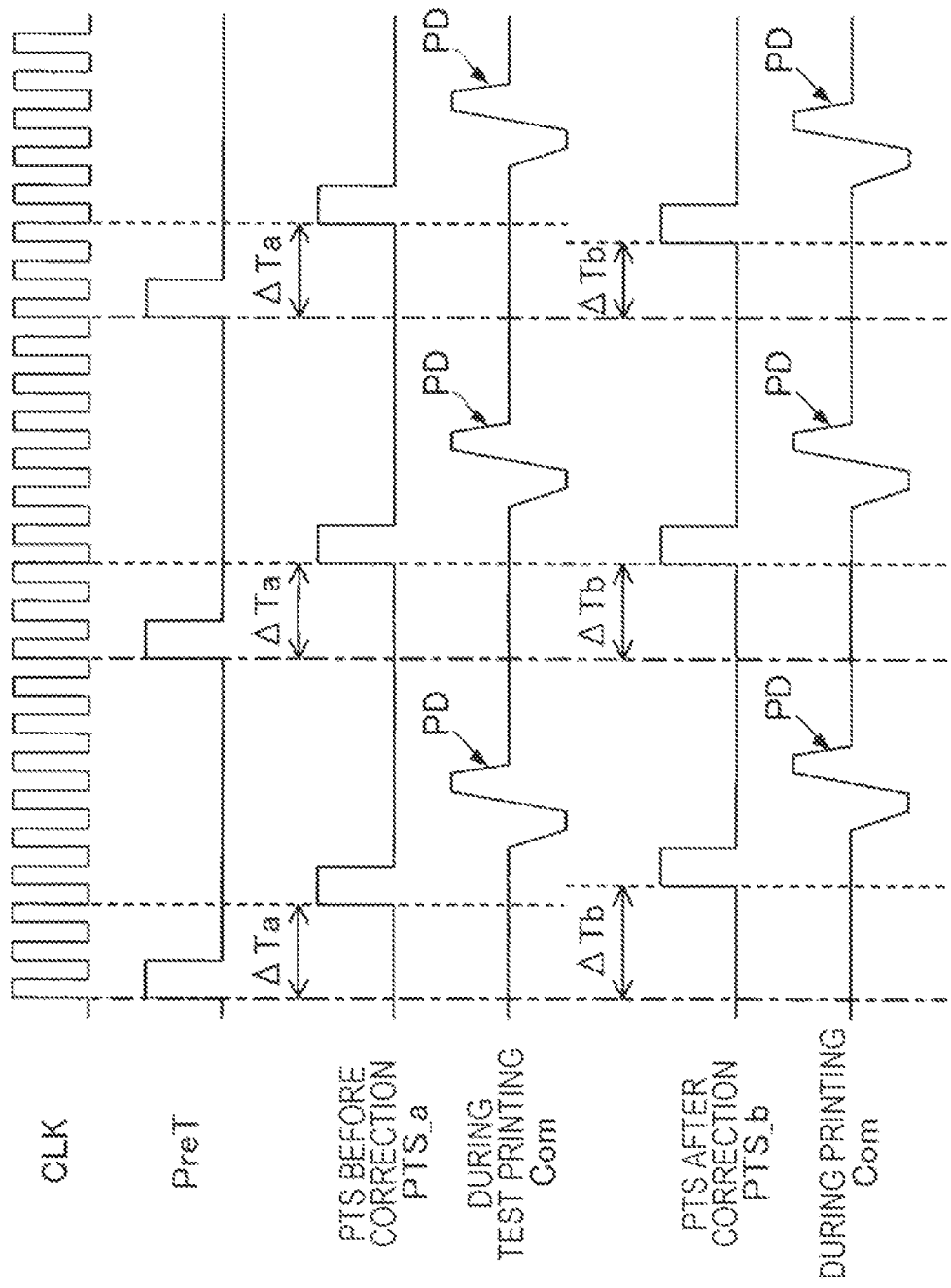
FIG. 5 is a timing chart for explaining a discharge timing.

FIG. 5 is a timing chart for explaining the discharge timing. FIG. 5 schematically illustrates a timing relationship between the clock signal CLK, the pretiming signal PreT, the timing signal PTS, and the drive signal Com.

As illustrated in FIG. 5, the pulse of the pretiming signal PreT is generated at a fixed cycle for each predetermined number of clocks of the clock signal CLK. A timing signal PTS_a, which is the timing signal PTS before correction using the timing data DT described above, has a pulse generated at a timing delayed by a certain delay time ΔTa with respect to the pulse of the pretiming signal PreT. Therefore, when the timing signal PTS_a is used, the generation timing of the drive pulse PD of the drive signal Com is a constant period.

On the other hand, a timing signal PTS_b, which is the timing signal PTS corrected using the timing data DT, has a pulse generated at a timing delayed by a delay time ΔTb that changes based on the timing data DT with respect to the pulse of the pretiming signal PreT. Therefore, when the timing signal PTS_b is used, the generation timing of the drive pulse PD of the drive signal Com may be different from when the timing signal PTS_a is used.

Description is given of comparison between this embodiment and a typical ink jet printer. A typical ink jet printer is substantially classified into a serial head type where a head is reciprocated on a medium and a line head type where a long head is fixed and a medium passes under the head. In the former serial head type, a linear encoder is provided in a reciprocating direction of the head, and the linear encoder outputs a signal corresponding to a relative speed between the medium and the head. On the other hand, in the latter line head type, a rotary encoder is provided in a medium transport mechanism, and the rotary encoder outputs a signal corresponding to a relative speed between the medium and the head. Therefore, in the typical ink jet printer, the timing to discharge ink from the head can be specified based on the output from the linear encoder or the rotary encoder.

That is, in the typical ink jet printer, the frequency of the timing signal that defines the interval of discharging a liquid from the head corresponds to the output from the encoder. Therefore, the frequency of the timing signal actively fluctuate according to the relative speed between the medium and the head. On the other hand, in this embodiment, although the encoder that detects the rotation angle of the joint section of the robot 2 is provided, the encoder of the robot 2 is not configured to directly output the relative position and speed between the medium and the head. More specifically, the printer of this embodiment is not provided with a configuration corresponding to the encoder in the typical ink jet printer. Therefore, the frequency of the timing signal PTS in this embodiment does not correspond to the output from the encoder, but is based on the clock signal CLK of a certain frequency outputted by the clock source 6a1. Therefore, the frequency of the timing signal PTS does not actively fluctuate according to the relative speed between the workpiece and the head unit during execution of a printing operation to be described later. Accordingly, it is preferable to use the timing data DT of the timing signal PTS based on the clock signal CLK for correction as described above.

1-5. Operation of Three-Dimensional Object Printer 1

Figure 6:
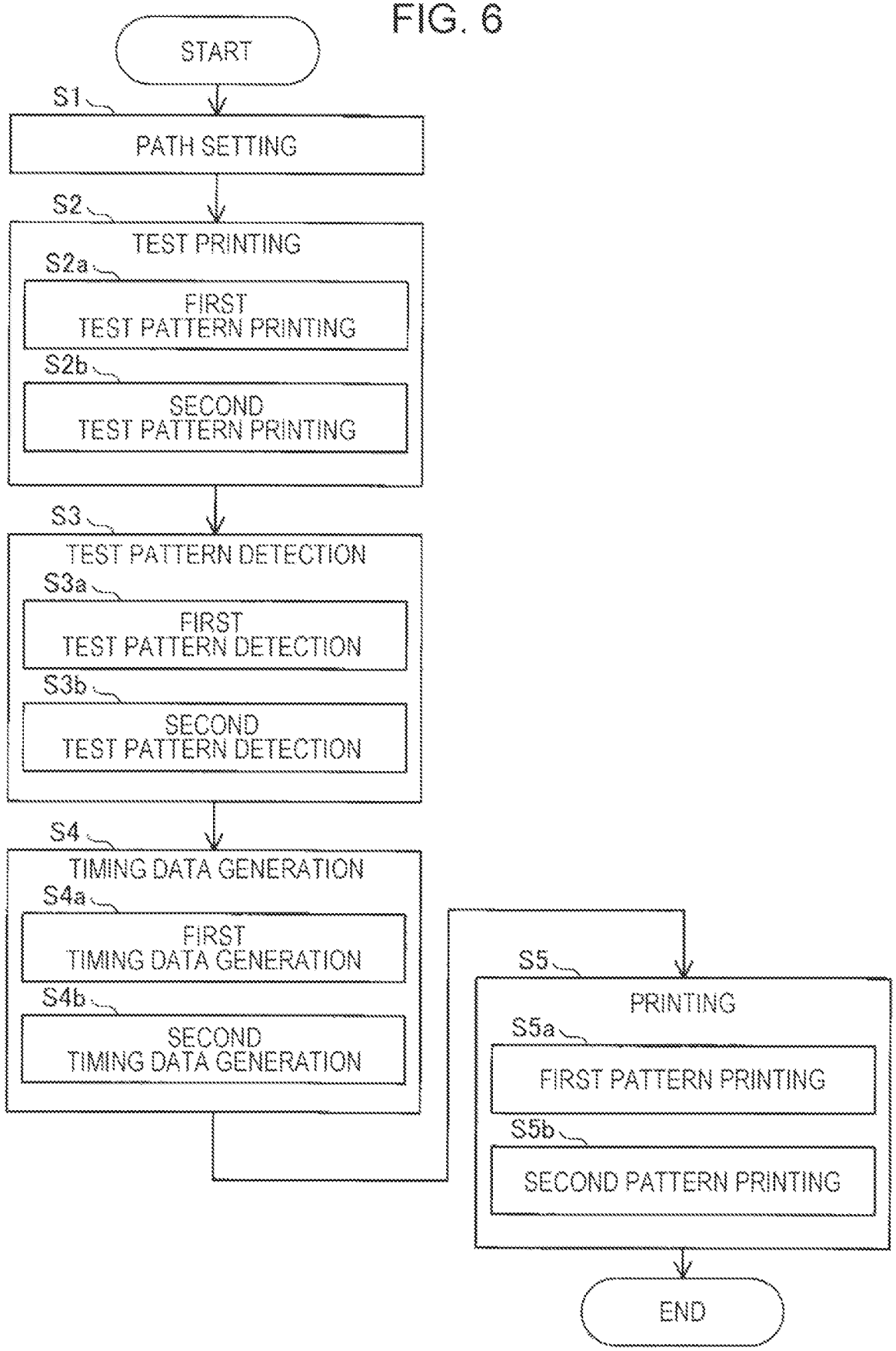
FIG. 6 is a flowchart for explaining a three-dimensional object printing method according to the first embodiment.

FIG. 6 is a flowchart for explaining a three-dimensional object printing method according to the first embodiment. The three-dimensional object printing method is performed using the three-dimensional object printer 1 described above. As illustrated in FIG. 6, the three-dimensional object printer 1 executes a path setting step S1, a test printing step S2, a test pattern detection step S3, a timing data generation step S4, and a printing step S5 in this order.

In step S5, the three-dimensional object printer 1 prints an image based on the image data Img onto the workpiece W by dividing the operation into a plurality of paths. FIG. 6 illustrates when the number of the paths is two. Therefore, step S5 includes step S5a of performing first pattern printing and step S5b of performing second pattern printing. Likewise, step S2 includes a step S2a of printing a first test pattern and a step S2b of printing a second test pattern. Step S3 includes a step S3a of detecting the first test pattern and a step S1b of detecting the second test pattern. Step S4 includes a step S4a of generating first timing data and a step S4b of generating second timing data.

Steps S1 to S5 will be described in detail below. First, a printing operation of each path of the robot 2 in steps S2 and S5 will be described.

Figure 8:
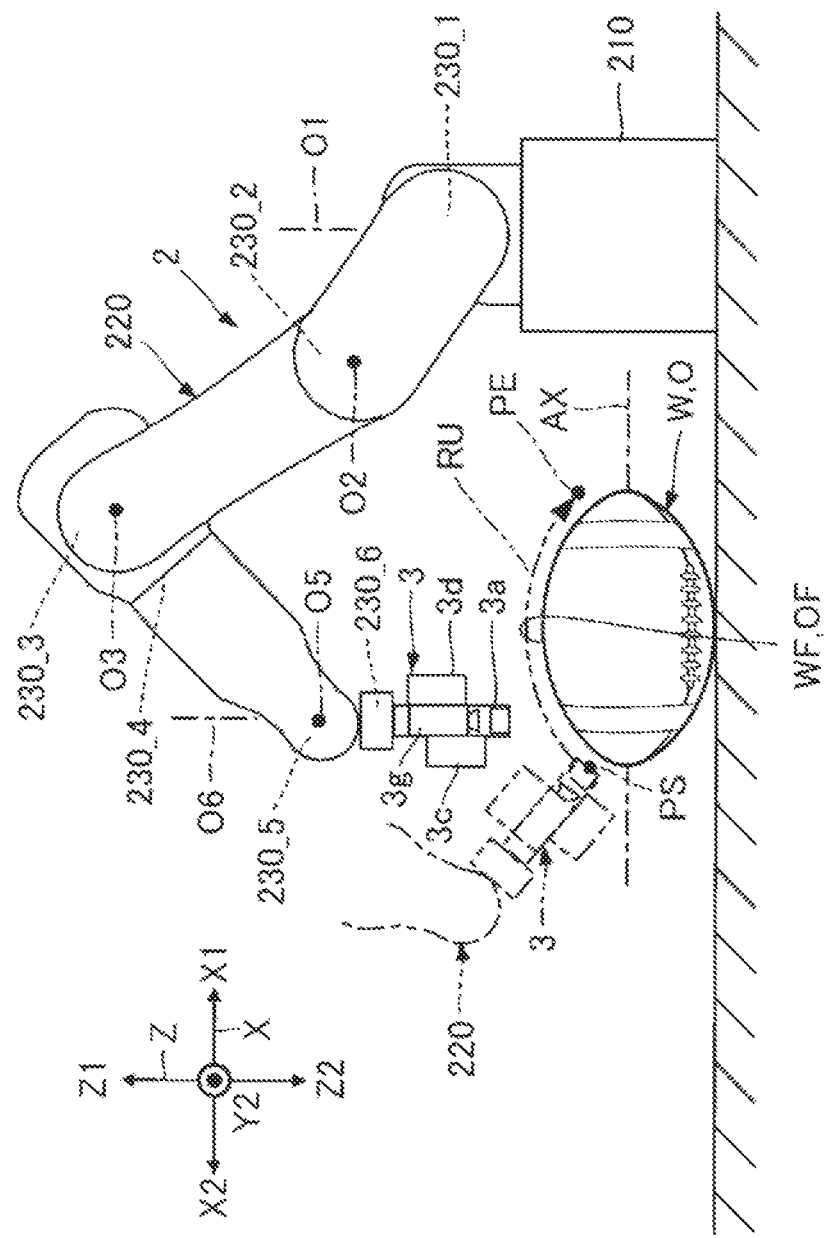
FIG. 8 is a side view illustrating a robot during a printing operation.

FIG. 8 is a side view illustrating the robot 2 during the printing operation. FIG. 8 illustrates when printing is performed on a workpiece W having a long spherical shape or an object O corresponding to the workpiece W, which is arranged so that a long axis AX of the workpiece W is parallel to the X-axis. The workpiece W or the object O is placed at a position in the X2 direction with respect to the robot 2.

The object O is an object having a surface OF of substantially the same shape and posture as the surface WF. For example, the object O is an object having substantially the same shape as the workpiece W, and is set in substantially the same posture as the workpiece W, in place of the workpiece W. The material of the object O may be the same as or different from that of the workpiece W. The object O may be a film peelably attached to the surface WF of the workpiece W. The film is provided with a receiving layer for facilitating ink absorption as needed.

In the printing operation, as illustrated in FIG. 8, the robot 2 moves the head 3*a* along the scanning path RU. The scanning path RU is a path along the surface WF from a position PS to a position PE. The scanning path RU has a linear shape extending along the X-axis when viewed in the Z2 direction.

In the printing operation, the robot 2 operates three joint sections 230 out of the six joint sections 230. In the example illustrated in FIG. 8, the robot 2 operates the joint sections 230_2, 230_3, and 230_5 in a state where the rotation axes thereof are parallel to the Y-axis while the printing operation is being executed. Thus, the head 3*a* can be stably moved along the scanning path RU by operating the three joint sections 230.

It is preferable that the robot 2 controls the posture of the head 3*a* according to the curved surface of the surface WF or the surface OF so that the landing direction of the ink from the head 3*a* is constant with respect to the surface WF. Therefore, it is preferable to change a pitch angle of the head 3*a* in the scanning path RU while keeping a yaw angle and a roll angle of the head 3*a* in the scanning path RU constant. It is also preferable that the robot 2 controls the position and posture of the head 3*a* so that the distance between the surface WF or the surface OF and the nozzle array La or the nozzle array Lb is constant. In this embodiment, the positions of the nozzle arrays La and Lb may be regarded as the same position.

The yaw angle, roll angle, and pitch angle of the head will be described. The yaw angle, roll angle, and pitch angle of the head 3*a* are expressed as rotation amounts around the c-axis, a-axis, and b-axis with respect to any set reference posture of the head 3*a*. In the reference posture of the head 3*a*, the relationship between the a-, b-, and c-axes and the X-, Y-, and Z-axes is uniquely fixed.

The head yaw angle in a first posture of the head 3*a* is expressed as the amount of rotation around the c-axis required for a posture change from the reference posture to the first posture. The amount of rotation around the c-axis is an absolute value of an angle formed by the a-axis in the reference posture and the a-axis in the first posture when viewed in the direction along the c-axis in the reference posture. Alternatively, the amount of rotation around the c-axis is an absolute value of an angle formed by the b-axis in the reference posture and the b-axis in the first posture when viewed in the direction along the c-axis in the reference posture.

Likewise, the head roll angle in the first posture of the head 3*a* is expressed as the amount of rotation around the a-axis required for the posture change from the reference posture to the first posture. The amount of rotation around the a-axis is an absolute value of an angle formed by the b-axis in the reference posture and the b-axis in the first posture when viewed in the direction along the a-axis in the reference posture. Alternatively, the amount of rotation around the a-axis is an absolute value of an angle formed by the c-axis in the reference posture and the c-axis in the first posture when viewed in the direction along the a-axis in the reference posture.

Likewise, the head pitch angle in the first posture of the head 3*a* is expressed as the amount of rotation around the b-axis required for the posture change from the reference posture to the first posture. The amount of rotation around the b-axis is an absolute value of an angle formed by the a-axis in the reference posture and the a-axis in the first posture when viewed in the direction along the b-axis in the reference posture. Alternatively, the amount of rotation around the b-axis is an absolute value of an angle formed by the c-axis in the reference posture and the c-axis in the first posture when viewed in the direction along the b-axis in the reference posture.

Printing is performed on the workpiece W or the object O by the above printing operation. In the printing operation of this embodiment, the rotation axes O2, O3, and O5 are set parallel to each other. However, the present disclosure is not limited thereto, and the rotation axes O2, O3, and O6 may be set parallel to each other, for example. In this case, the head 3*a* is moved along the scanning path RU by operating the joint sections 230_2, 230_3, and 230_6.

Figure 7:
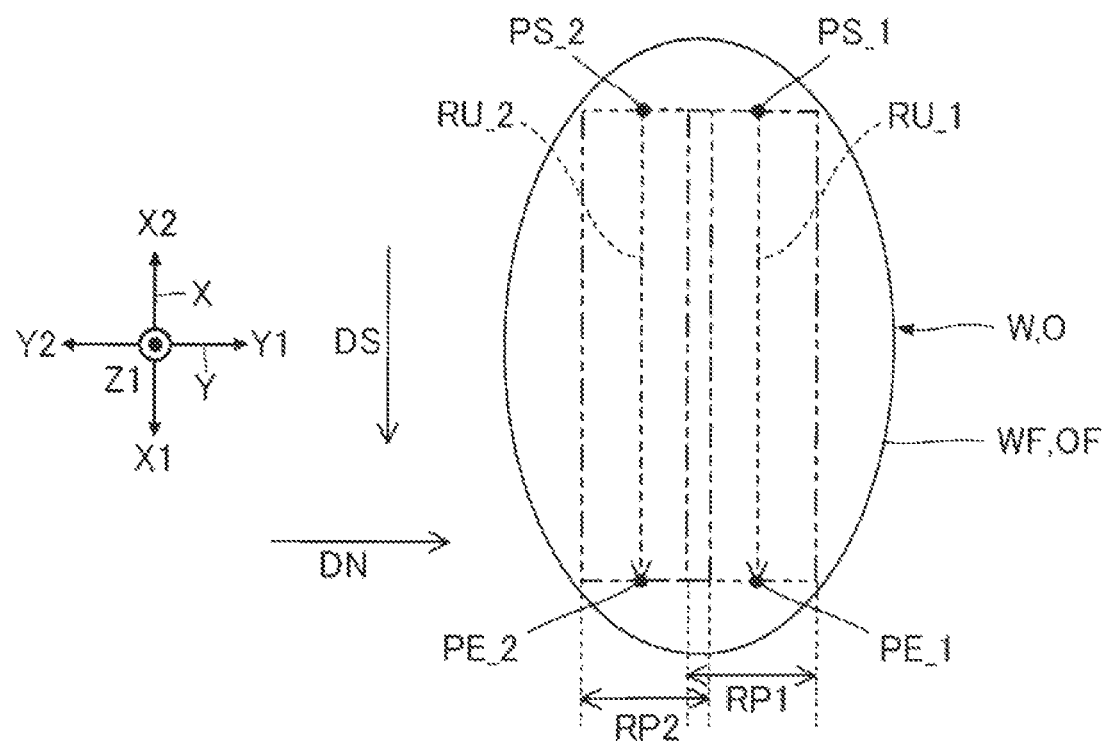
FIG. 7 is a diagram for explaining a first region and a second region of a workpiece or an object corresponding to the workpiece.

FIG. 7 is a diagram for explaining a first region RP1 and a second region RP2 of the workpiece W or the object O corresponding to the workpiece W. FIG. 7 illustrates when a scanning direction DS of the head 3*a* with respect to the workpiece W is the direction along the X-axis, and a nozzle array direction DN which is the direction of the nozzle array La or the nozzle array Lb is orthogonal to the scanning direction DS. The first and second regions RP1 and RP2 are regions of the workpiece W or the object O that are located at different positions in the nozzle array direction DN. In the example illustrated in FIG. 7, the first and second regions RP1 and RP2 partially overlap with each other. The first and second regions RP1 and RP2 do not have to partially overlap with each other as long as the regions are located at different positions in the nozzle array direction DN. The nozzle array direction DN does not have to be orthogonal to the scanning direction DS as long as the nozzle array direction DN intersects the scanning direction DS.

In step S1 described above, the scanning path RU_1 of the head unit 3 with respect to the first region RP1 and the scanning path RU_2 of the head unit 3 with respect to the second region RP2 are set. This setting is performed, for example, by the computer 7 generating the path information Da based on the CAD data on the workpiece W and storing the path information Da in the storage circuit 5*a* of the controller 5.

The scanning path RU_1 is a path along the surface WF from a position PS_1 to a position PE_1, and has a linear shape extending along the X-axis when viewed in the Z2 direction. Likewise, the scanning path RU_2 is a path along the surface WF from a position PS_2 to a position PE_2, and has a linear shape extending along the X-axis when viewed in the Z2 direction. In the following, the scanning paths RU_1 and RU_2 may be referred to as the scanning path RU. The positions PS_1 and PS_2 may be referred to as the position PS. The positions PE_1 and PE_2 may be referred to as the position PE.

Figure 9:
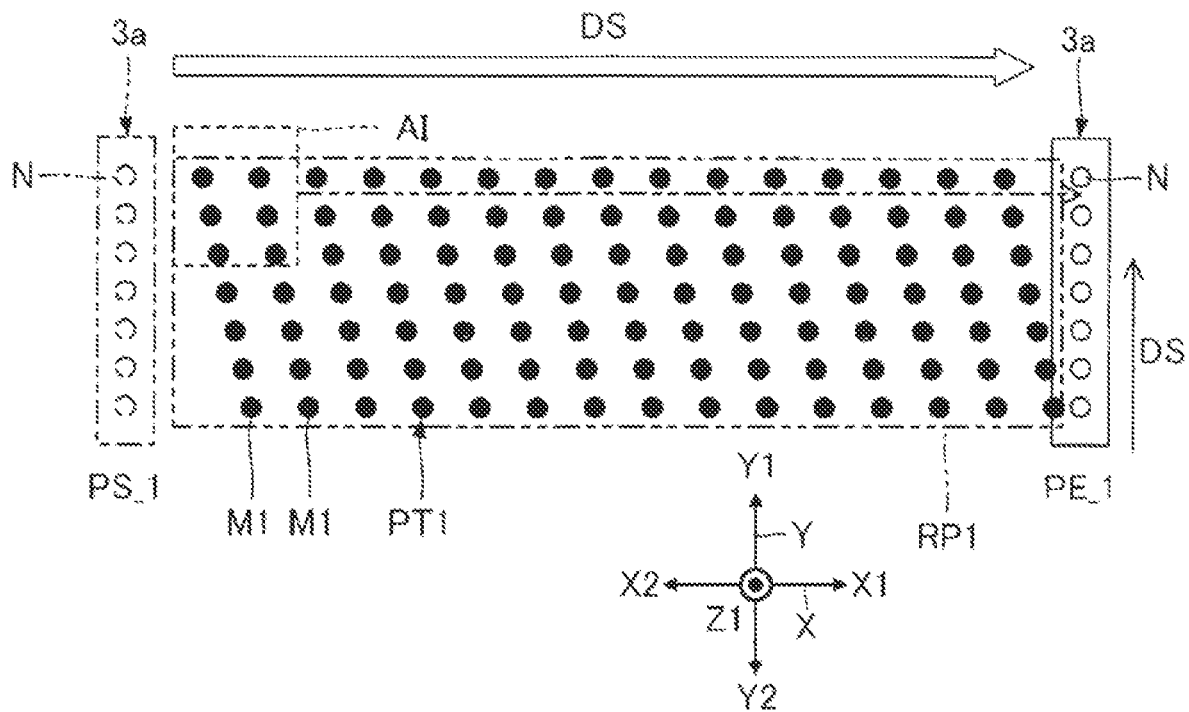
FIG. 9 is a diagram for explaining a first test printing step, a first detection step, and a first timing data generation step.

FIG. 9 is a diagram for explaining step S2*a* as an example of the first test printing step, step S3*a* as an example of the first detection step, and step S4*a* as an example of the first timing data generation step. In step S2*a*, as illustrated in FIG. 9, a first test pattern PT1 is printed in the first region RP1. This printing is performed by the head unit 3 discharging ink onto the first region RP1 from the nozzle array La or Lb based on the first test pattern data while the robot 2 is changing the position of the head unit 3 relative to the workpiece W or the object O along the scanning path RU_1. In this event, the timing of discharging ink droplets from the head 3a is based on a timing signal PTS_a, which is the timing signal PTS before correction.

The first test pattern PT1 includes a plurality of marks M1. Each mark M1 is formed, for example, by one ink droplet discharged from the nozzle N. The plurality of marks M1 included in the first test pattern PT1 are arranged so as to be spaced apart from each other, and an arrangement density thereof is, for example, about 50 dpi to 75 dpi. On the other hand, printing resolution as a performance value of the three-dimensional object printer 1 is higher than the arrangement density, and is 600 dpi to 1200 dpi, for example.

The marks M1 formed by the ink from the nozzles N different from each other are arranged at different positions in the scanning direction so as to correspond to the printing resolution as the performance value of the three-dimensional object printer 1 or the arrangement density close to the printing resolution. Therefore, based on the first test pattern PT1, it is possible to detect landing positions of ink droplets from the nozzles N when printing is performed at the printing resolution as the performance value of the three-dimensional object printer 1.

When the scanning speed of the head unit 3 and the posture thereof around the yaw axis with respect to the workpiece W or the object O are ideal, a plurality of marks M1 formed by the ink from the same nozzles N are arranged in the scanning direction at regular intervals. On the other hand, when the scanning speed of the head unit 3 and the posture thereof around the yaw axis with respect to the workpiece W or the object O are not ideal, the intervals between the plurality of marks M1 formed by the ink from the same nozzles N will vary.

In step S3a described above, the detector 7b1 detects the first test pattern PT1 based on the result of imaging the first test pattern PT1 by the imaging device 3g. The imaging is performed, for example, while performing scanning of the imaging device 3g along with the scanning of the head unit 3 during formation of the first test pattern PT1. The imaging may be performed by the imaging device 3g in a separate scanning operation after the first test pattern PT1 is formed. Also, the scanning of the imaging device 3g is performed more than once at different positions in the nozzle array direction DN as needed, so that the imaging result of the entire first test pattern PT1 can be obtained.

In step S4a described above, the processing circuit 7b generates the first timing data DT1 based on the detection result obtained in step S3a. More specifically, the processing circuit 7b generates the first timing data DT1 indicating a correction value of ink discharge timing for each pixel based on the interval between the plurality of marks M1 arranged in the scanning direction of the first test pattern PT1.

In FIG. 9, a field angle AI of the imaging device 3g is indicated by the broken line. The field angle AI includes two or more marks M1. When two or more marks M1 located at different positions in the scanning direction DS are included in the field angle AI, deviation of the landing positions of these marks M1 in the scanning direction DS can be detected based on the positional relationship between these marks M1.

Figure 10:
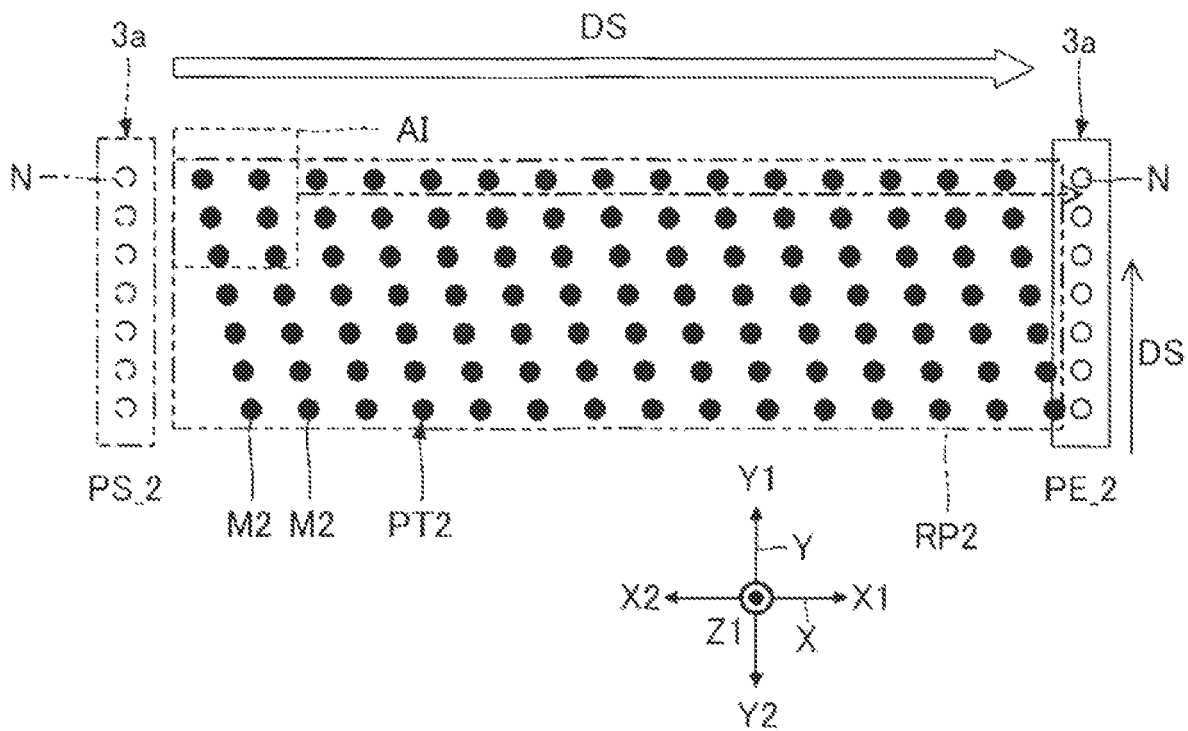
FIG. 10 is a diagram for explaining a second test printing step, a second detection step, and a second timing data generation step.

FIG. 10 is a diagram for explaining step S2b as an example of the second test printing step, step S1b as an example of the second detection step, and step S4b as an example of the second timing data generation step. In step S2b, as illustrated in FIG. 10, a second test pattern PT2 is printed in the second region RP2. This printing is performed by the head unit 3 discharging ink onto the second region RP2 from the nozzle array La or Lb based on the second test pattern data while the robot 2 is changing the position of the head unit 3 relative to the workpiece W or the object O along the scanning path RU_2. In this event, the timing of discharging ink droplets from the head 3a is based on the timing signal PTS_a, which is the timing signal PTS before correction.

The second test pattern PT2 includes a plurality of marks M2 similar to the marks M1 of the first test pattern PT1 described above. The second test pattern PT2 may be different from the first test pattern PT1 as long as the second test pattern PT2 conforms to the first test pattern PT1.

In step S3b described above, the detector 7b1 detects the second test pattern PT2 based on the result of imaging the second test pattern PT2 by the imaging device 3g, as in the detection of the first test pattern PT1 in step S3b.

In step S4b described above, the processing circuit 7b generates the second timing data DT2 based on the detection result obtained in step S3b. More specifically, the processing circuit 7b generates the second timing data DT2 indicating the correction value of ink discharge timing for each pixel based on the interval between the plurality of marks M2 arranged in the scanning direction of the second test pattern PT2.

Figure 11:
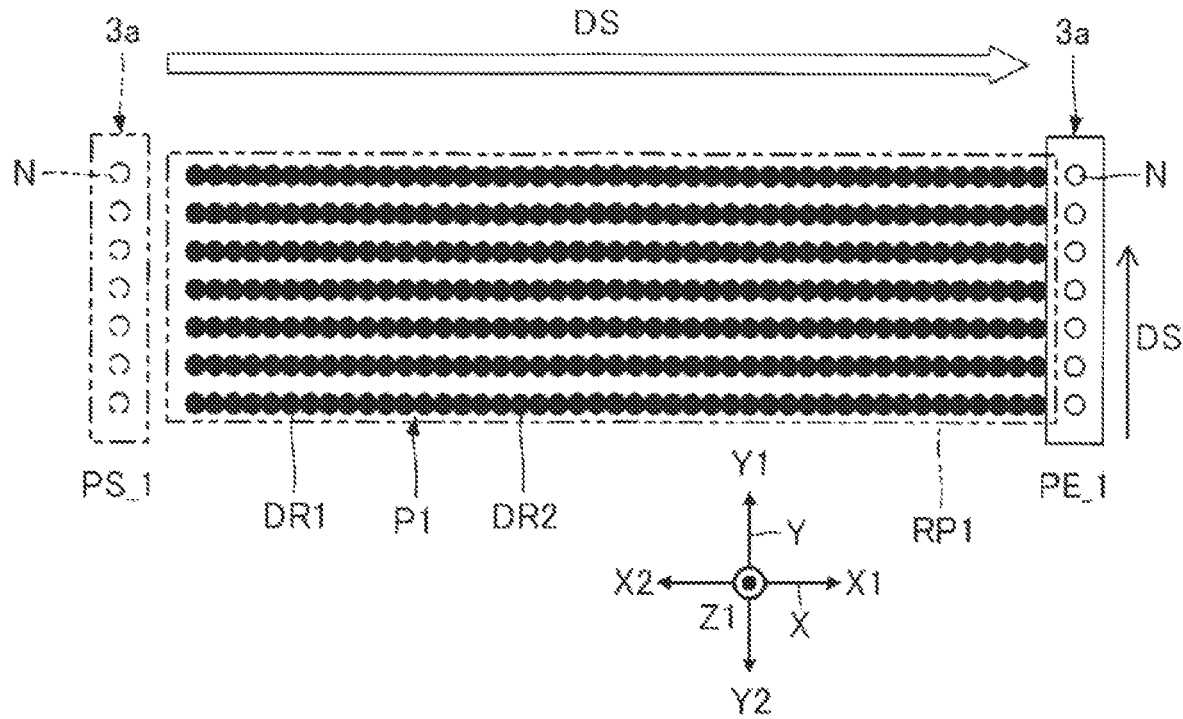
FIG. 11 is a diagram for explaining a first printing step.

FIG. 11 is a diagram for explaining step S5a as an example of the first printing step. In step S5a, as illustrated in FIG. 11, a first pattern P1 is printed in the first region RP1 of the workpiece W. This printing is performed by the head unit 3 discharging ink onto the first region RP1 of the workpiece W from the nozzle array La or Lb based on the discharge data DD and the first timing data DT1 while the robot 2 is changing the position of the head unit 3 relative to the workpiece W along the scanning path RU_1. In this event, the timing of discharging ink droplets from the head 3a is based on a timing signal PTS_b, which is the corrected timing signal PTS.

The first pattern P1 is not particularly limited but may be an image in which dots of ink are arranged in the scanning direction DS with an arrangement density equal to or close to the printing resolution as a performance value of the three-dimensional object printer 1.

The first pattern P1 includes first dots formed by first droplets DR1 based on the first pixel data DG1 described above and second dots formed by second droplets DR2 based on the second pixel data DG2 described above. The discharge timing for each of the first and second droplets DR1 and DR2 is adjusted based on the first timing data DT1 so that the droplets land at desired positions in the first region RP1.

Figure 12:
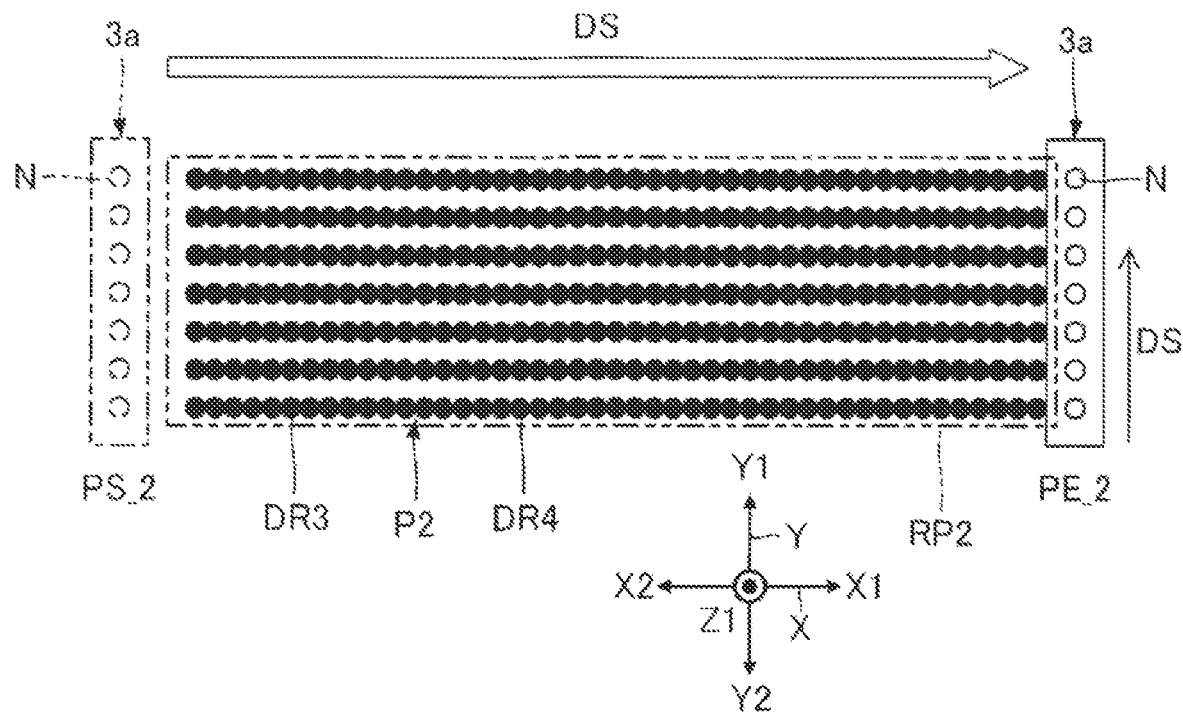
FIG. 12 is a diagram for explaining a second printing step.

FIG. 12 is a diagram for explaining step S5b as an example of the second printing step. In step S5b, as illustrated in FIG. 12, a second pattern P2 is printed in the second region RP2 of the workpiece W. This printing is performed by the head unit 3 discharging ink onto the second region RP2 of the workpiece W from the nozzle array La or Lb based on the discharge data DD and the second timing data DT2 while the robot 2 is changing the position of the head unit 3 relative to the workpiece W along the scanning path RU_2. In this event, the timing of discharging ink droplets from the head 3a is based on a timing signal PTS_b, which is the corrected timing signal PTS.

The second pattern P2 is not particularly limited but may be, as in the case of the first pattern P1 described above, an image in which dots of ink are arranged in the scanning direction DS with an arrangement density equal to or close to the printing resolution as a performance value of the three-dimensional object printer 1.

The second pattern P2 includes third dots formed by third droplets DR3 based on the third pixel data DG3 described above and fourth dots formed by fourth droplets DR4 based on the fourth pixel data DG4 described above. The discharge timing for each of the third and fourth droplets DR3 and DR4 is adjusted based on the second timing data DT2 so that the droplets land at desired positions in the second region RP2.

Therefore, the discharge timing of the third droplets DR3 is adjusted so that the landing positions of the third droplets DR3 in the second region RP2 coincide with the landing positions of the first droplets DR1 in the scanning direction DS. Likewise, the discharge timing of the fourth droplets DR4 is adjusted so that the landing positions of the fourth droplets DR4 in the second region RP2 coincide with the landing positions of the second droplets DR2 in the scanning direction DS. Since the second timing data DT2 is usually different from the first timing data DT1, the length of the period from the discharge timing of the third droplets DR3 to the discharge timing of the fourth droplets DR4 is different from the length of the period from the discharge timing of the first droplets DR1 to the discharge timing of the second droplets DR2.

As described above, the three-dimensional object printer 1 according to this embodiment performs printing in the first and second regions RP1 and RP2. However, there are also cases where printing is performed only in the first region RP1 and not in the second region RP2. That is, step S2b of printing the second test pattern, step S1b of detecting the second test pattern, step S4b of generating the second timing data, and step S5b of printing the second pattern may not be executed.

As described above, the three-dimensional object printer 1 includes the head unit 3, the robot 2, and the detector 7b1. The head unit 3 has the nozzle array La or nozzle array Lb as an example of a "first nozzle array" that discharges ink as an example of a "liquid" onto a three-dimensional workpiece W. The robot 2 changes relative positions and postures of the workpiece W and the head unit 3. The detector 7b1 detects a test pattern printed on the workpiece W or the object O corresponding to the workpiece W.

The three-dimensional object printer 1 executes a three-dimensional object printing method for printing on the workpiece W using the head unit 3 and the robot 2. As described above, the three-dimensional object printing method includes step S2a as an example of the "first test printing step", step S3a as an example of the "first detection step", and step S5a as an example of the "first printing step".

In step S2a, the first test pattern PT1 is printed by the head unit 3 discharging ink onto the first region RP1 of the workpiece W or the object O from the nozzle array La or Lb while the robot 2 is changing the position of the head unit 3 relative to the workpiece W or the object O.

In step S3a, the first test pattern PT1 is detected.

In step S5a, the first pattern P1 is printed by the head unit 3 discharging ink onto the first region RP1 from the nozzle array La or Lb based on the detection result obtained in step S4 while the robot 2 is changing the position of the head unit 3 relative to the workpiece W.

In the three-dimensional object printing method, the head unit 3 discharges the ink onto the first region RP1 from the nozzle array La or Lb, in the first printing step of step S5a, based on the detection result obtained in the first detection step of step S3a. Therefore, even when a state of the head unit 3 such as the speed during scanning or the posture around the pitch axis with respect to the workpiece W deviates from its target state in step S5a, the first pattern P1 can be formed so as to reduce such deviation. As a result, deterioration of image quality due to the deviation of the first pattern P1 can be reduced.

The interval of the timing signal that defines the interval for discharging ink by the head unit 3 does not fluctuate depending on the relative speed between the workpiece and the head unit during the execution of step S2a as an example of the "first test printing step". That is, in this embodiment, in order to support a three-dimensional workpiece, a configuration corresponding to a linear encoder, a rotary encoder, or the like in a typical ink jet printer is not provided. In other words, there is no configuration provided that directly outputs relative position and speed between the head and the workpiece. In such a case, a significant effect is achieved by the three-dimensional object printing method including the "first test printing step", the "first detection step", and the "first printing step" as described above.

The interval of the timing signal that defines the interval for discharging ink by the head unit 3 is defined by the clock signal CLK of a certain frequency from the clock source 6a1. According to such a configuration, a favorable timing interval can be specified even when a configuration corresponding to a linear encoder, a rotary encoder, or the like in a typical ink jet printer is not provided.

As described above, the three-dimensional object printing method of this embodiment includes step S2b as an example of the "second test printing step", step S1b as an example of the "second detection step", and step S5b as an example of the "second printing step".

In step S2b, the second test pattern PT2 is printed by the head unit 3 discharging ink onto the second region RP2 of the workpiece W or the object O, which is different in position from the first region RP1 in the direction of the nozzle array La or Lb, from the nozzle array La or Lb while the robot 2 is changing the position of the head unit 3 relative to the workpiece W or the object O.

In step S3b, the second test pattern PT2 is detected.

In step S5b, the second pattern P2 is printed by the head unit 3 discharging ink onto the second region RP2 from the nozzle array La or Lb based on the detection result obtained in step S5 while the robot 2 is changing the position of the head unit 3 relative to the workpiece W.

As described above, in the second printing step of step S5b, the head unit 3 discharges ink from the nozzle array La or Lb onto the second region RP2 based on the detection result obtained in the second detection step of step S3b. Therefore, even when a state of the head unit 3 such as the speed during scanning or the posture around the pitch axis with respect to the workpiece W deviates from its target state in step S5b, the second pattern P2 can be formed so as to reduce such deviation. As a result, deterioration of image quality due to the deviation of the second pattern P2 can be reduced. The second region RP2 is a region at a different position in the direction of the nozzle array La in step S2a or the direction of the nozzle array Lb in step S2a.

The first printing step of step S5a uses the detection result of the first detection step in step S3a related to the printing result of the first test printing step in step S2a, whereas the second printing step of step S5b uses the detection result of the second detection step in step S1b related to the printing result of the second test printing step in step S2b. Therefore, even when fluctuations in the state of the head unit 3 such as the speed during scanning or the posture around the pitch axis with respect to the workpiece W in these printing steps are different from each other, deterioration of the image quality of both the first and second patterns P1 and P2 can be reduced by performing appropriate correction in each printing step.

As described above, in steps S5a and S5b, ink is discharged from the head unit 3 based on the discharge data DD. The discharge data DD includes the first pixel data DG1, the second pixel data DG2, the third pixel data DG3, and the fourth pixel data DG4. The first and third pixel data DG1 and DG3 are data related to pixels corresponding to the same position in the scanning direction of the head unit 3 with respect to the workpiece W. The second and fourth pixel data DG2 and DG4 are data related to pixels corresponding to the same position in the scanning direction of the head unit 3 with respect to the workpiece W.

Then, in step S5a, the first droplets DR1 based on the first pixel data DG1 and the second droplets DR2 based on the second pixel data DG2 are discharged from the nozzle array La or the nozzle array Lb. Likewise, in step S5b, the third droplets DR3 based on the third pixel data DG3 and the fourth droplets DR4 based on the fourth pixel data DG4 are discharged from the nozzle array La or the nozzle array Lb. The length of the period from the discharge timing of the first droplets DR1 to the discharge timing of the second droplets DR2 is different from the length of the period from the discharge timing of the third droplets DR3 to the discharge timing of the fourth droplets DR4. This is because the discharge timings are individually adjusted for each scanning path under the condition that the macroscopic scanning speed of the head unit 3 with respect to the workpiece W is constant in steps S5a and S5b. Such individual adjustment of the discharge timings makes it possible to reduce the deterioration of the image quality of both the first and second patterns P1 and P2.

In the three-dimensional object printing method of this embodiment, as described above, step S4a as an example of the "first timing data generation step" is further executed between steps S3a and S5a. In step S4a, the first timing data DT1 is generated based on the detection result obtained in step S3a. In step S5a, the timing signal PTS that defines the timing of discharging ink from the nozzle array La or Lb is corrected based on the first timing data DT1. Therefore, the landing position of the ink can be adjusted for each pixel without correcting the image data Img and the discharge data DD. As described above, the timing signal PTS before the correction is the timing signal PTS_a, and the timing signal PTS after the correction is the timing signal PTS_b.

The first test pattern PT1 includes a plurality of marks M1, and the interval between the plurality of marks M1 is detected in step S4. In the first timing data generation step of step S4a, the first timing data DT1 is generated based on the interval between the plurality of marks M1. Therefore, the ink discharge timing can be adjusted so as to reduce the deterioration in image quality due to the fluctuation in the scanning speed of the head unit 3 with respect to the workpiece W in the first printing step.

As in step S4a, in the three-dimensional object printing method of this embodiment, step S4b as an example of the "second timing data generation step" of generating the second timing data DT2 based on the detection result from step S3b is further executed between steps S3b and S5b, as described above. Then, in step S5b, the timing signal PTS is corrected based on the second timing data DT2.

As described above, the timing of discharging ink from the nozzle array La or Lb in step S2a or S2b is specified based on the timing signal PTS_a as an example of the "reference timing signal" based on the clock signal CLK of a certain frequency.

The printing density of the first test pattern PT1 is lower than the printing density of the first pattern P1. Therefore, there is an advantage that the interval between the marks M1 can be easily detected as compared with when the printing density of the first test pattern PT1 is higher than the printing density of the first pattern P1.

2. SECOND EMBODIMENT

A second embodiment will be described below. In the embodiment exemplified below, for the elements whose operations and functions are the same as those of the first embodiment, the reference numerals used in the description of the first embodiment will be diverted and detailed description thereof will be omitted as appropriate.

Figure 13:
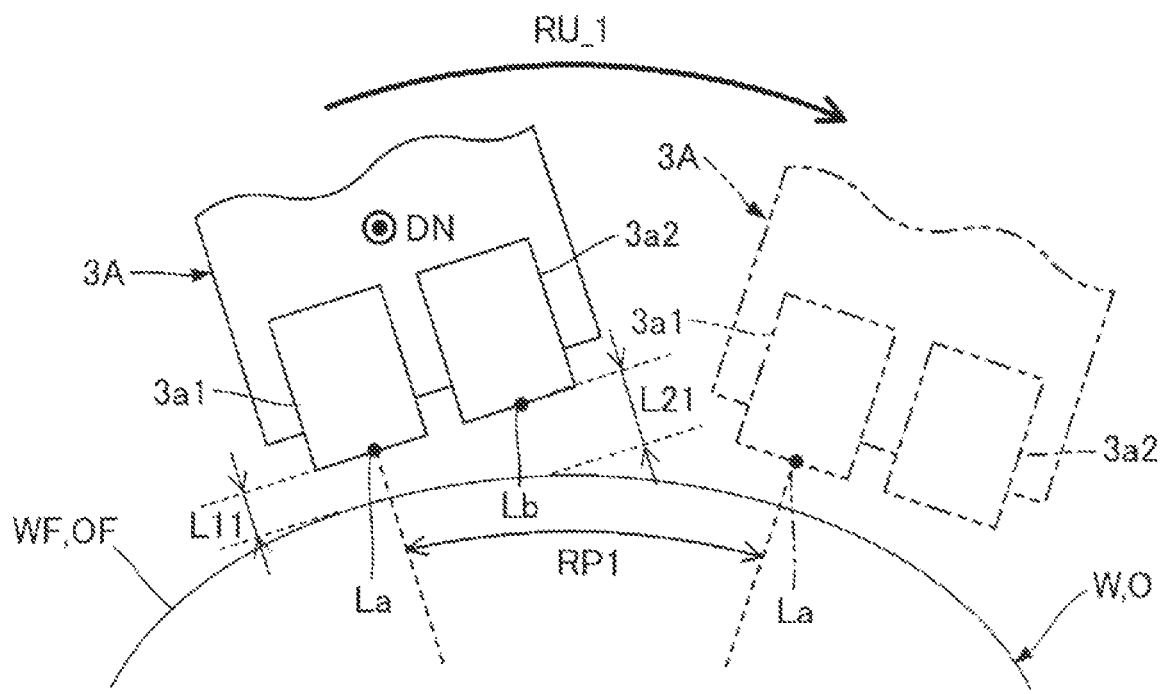
FIG. 13 is a diagram for explaining printing onto a first region in a second embodiment.
Figure 14:
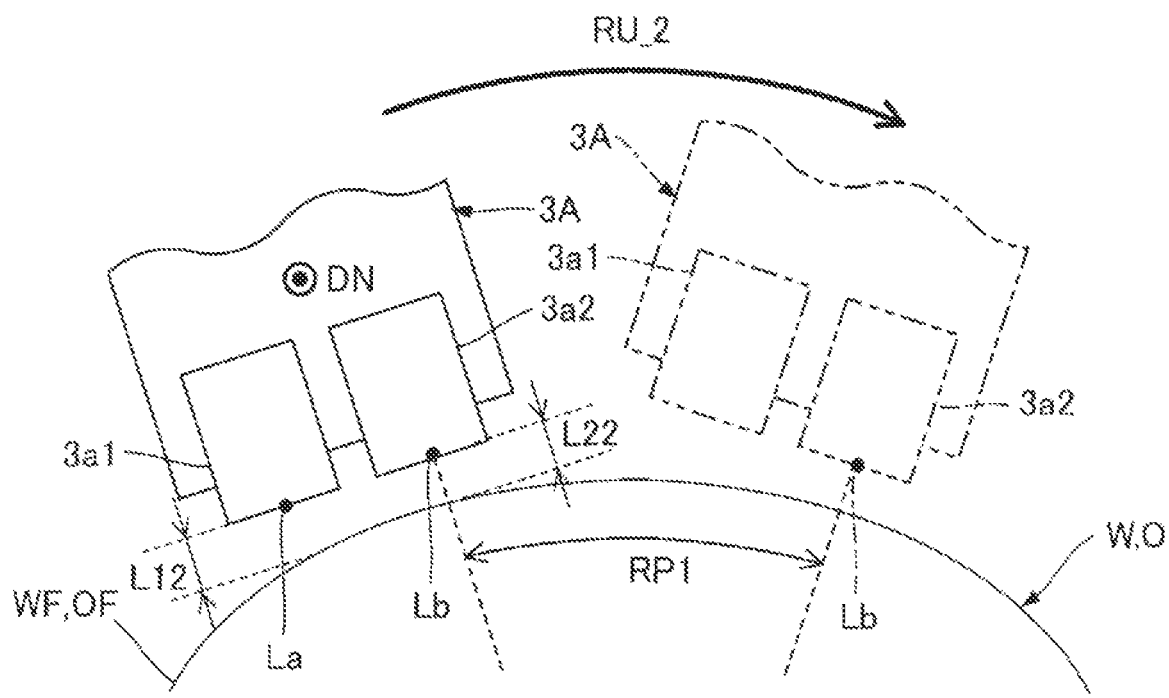
FIG. 14 is a diagram for explaining printing onto a second region in the second embodiment.

FIG. 13 is a diagram for explaining when printing is performed in a first region RP1 in the second embodiment to form a first test pattern or a first pattern. FIG. 14 is a diagram for explaining when printing is performed in the first region RP1 in the second embodiment to form a second test pattern or a second pattern. In this embodiment, a three-dimensional object printer having a head unit 3A, instead of the head unit 3, is used. In this embodiment, a nozzle array La and a nozzle array Lb are sequentially used for the printing in the first region RP1. In this embodiment, the nozzle array La is an example of a first nozzle array, and the nozzle array Lb is an example of a second nozzle array.

As illustrated in FIGS. 13 and 14, the head unit 3A includes a head 3a1 having the nozzle array La and a head 3a2 having the nozzle array Lb. These heads are arranged so that the nozzle arrays La and Lb are parallel to each other. As described above, in the head unit 3A, the nozzle arrays La and Lb are provided in the separate heads, and a distance between the nozzle arrays La and Lb is larger than that in the first embodiment.

In this embodiment, as illustrated in FIG. 13, when printing is performed by discharging ink from the nozzle array La onto the first region RP1, a distance L11 between the nozzle array La and the workpiece W or the object O in the c-axis direction is smaller than a distance L21 between the nozzle array Lb and the workpiece W or the object O in the c-axis direction. On the other hand, as illustrated in FIG. 14, when printing is performed by discharging ink from the nozzle array Lb onto the first region RP1, a distance L12 between the nozzle array Lb and the workpiece W or the object O in the c-axis direction is smaller than a distance L22 between the nozzle array La and the workpiece W or the object O in the c-axis direction.

Thus, printing quality is improved by bringing one of the nozzle arrays La and Lb used for printing closer to the workpiece W or the object O than the other nozzle array. Also, by printing an image with the ink from the nozzle array La and an image with the ink from the nozzle array Lb on the first region RP1 so that the images are superimposed on each other, multicolor printing can be realized when ink colors of these nozzle arrays are different. A region where the ink from the nozzle array La and the ink from the nozzle array Lb do not overlap may be provided besides the first region RP1.

The three-dimensional object printing method of this embodiment is the same as the three-dimensional object printing method of the first embodiment described above in that the printing region for each of the first test printing step, the second test printing step, the first printing step, and the second printing step is the first region RP1, and the nozzle array La is used for each of the first test printing step and the first printing step, except that the nozzle array Lb is used for each of the second test printing step and the second printing step.

The three-dimensional object printing method described above can also reduce deterioration of image quality of the first and second patterns, as in the first embodiment described above. Particularly, in this embodiment, when the distance between the nozzle arrays La and Lb is relatively large as described above, the scanning paths of the head unit 3A are slightly different from each other during printing when the printing is performed by sequentially using the different nozzle arrays for the same printing region. Then, since the movements of the joint sections 230 of the robot 2 are different from each other during scanning in the printing, movement errors are also different from each other. Therefore, by carrying out individual test printing steps and detection steps corresponding to these printing steps, the image quality of the first and second patterns can be improved as compared with those of the related art.

In this embodiment, as described above, when the color of the ink discharged from the nozzle array La is different from the color of the ink discharged from the nozzle array Lb, a multicolored image can be printed with the first and second patterns.

As described above, the distance L11 between the nozzle array La and the workpiece W in the discharge direction of the ink from the nozzle array La in the first printing step is shorter than the distance between the nozzle array Lb and the workpiece W in the discharge direction of the ink from the nozzle array Lb in the first printing step. On the other hand, the distance L22 between the nozzle array Lb and the workpiece W in the discharge direction of the ink from the nozzle array Lb in the second printing step is shorter than the distance L12 between the nozzle array La and the workpiece W in the discharge direction of the ink from the nozzle array La in the second printing step. Thus, since one of the nozzle arrays La and Lb used for printing is brought closer to the workpiece W than the other nozzle array, there is an advantage that the image quality of the first and second patterns can be easily improved.

Although not illustrated, in the first and second printing steps, the liquid is discharged from the head unit 3 based on the discharge data. The discharge data includes first pixel data, second pixel data, third pixel data, and fourth pixel data, as in the discharge data DD of the first embodiment described above. In the first printing step of this embodiment, first droplets based on the first pixel data and second droplets based on the second pixel data are discharged from the nozzle array La. On the other hand, in the second printing step of this embodiment, third droplets based on the third pixel data and fourth droplets based on the fourth pixel data are discharged from the nozzle array Lb. The length of the period from the discharge timing of the first droplets to the discharge timing of the second droplets is different from the length of the period from the discharge timing of the third droplets to the discharge timing of the fourth droplets. Such individual adjustment of the discharge timings makes it possible to reduce deterioration of the image quality of both the first and second patterns P1 and P2.

3. THIRD EMBODIMENT

A third embodiment will be described below. In the embodiment exemplified below, for the elements whose operations and functions are the same as those of the first embodiment, the reference numerals used in the description of the first embodiment will be diverted and detailed description thereof will be omitted as appropriate.

Figure 15:
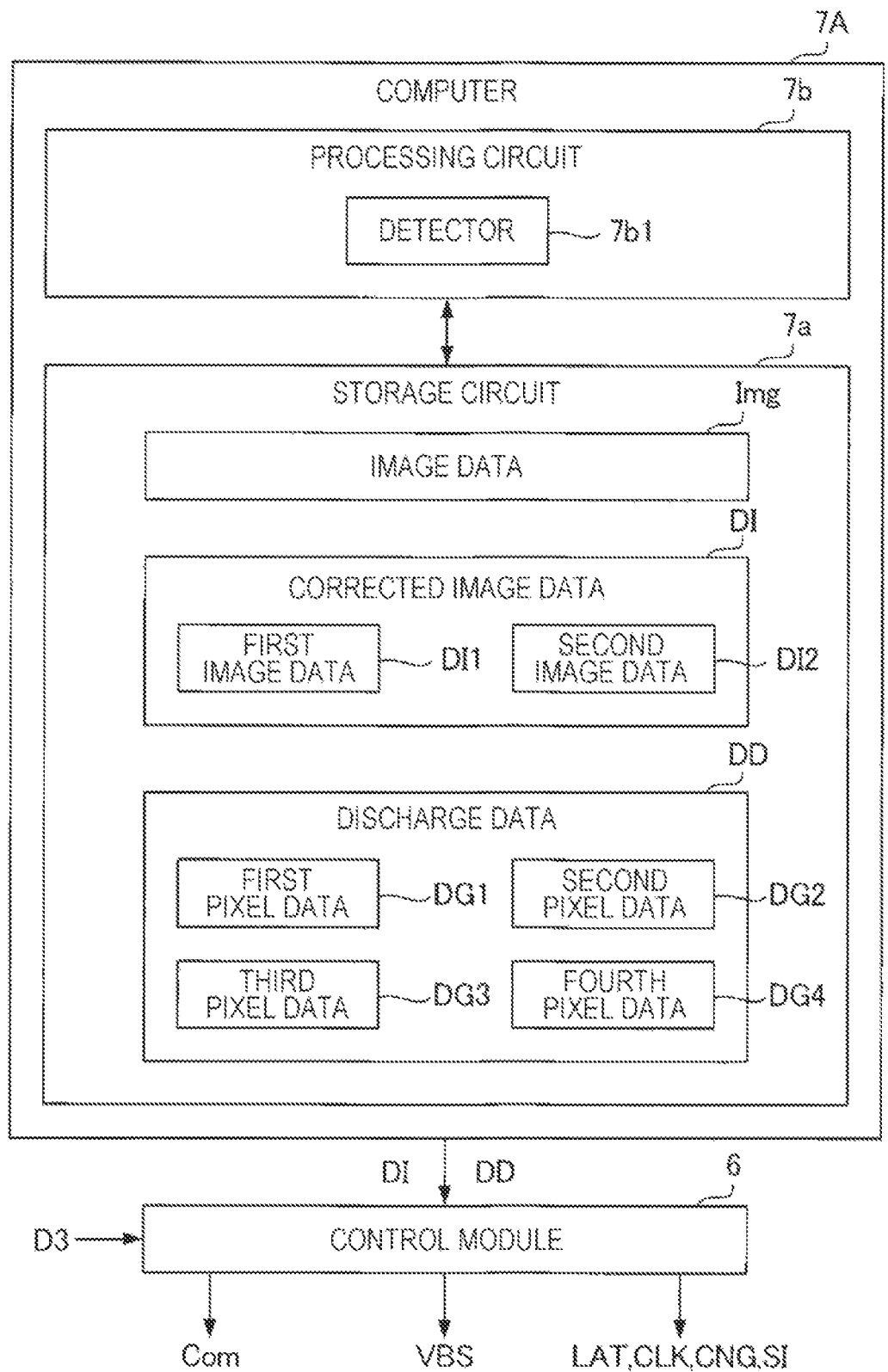
FIG. 15 is a diagram for explaining image data correction in a third embodiment.

FIG. 15 is a diagram for explaining correction of image data Img in the third embodiment. A three-dimensional object printer of this embodiment is the same as the three-dimensional object printer 1 of the first embodiment described above, except for including a computer 7A instead of the computer 7. The computer 7A is the same as the computer 7 of the first embodiment described above, except that the computer 7A corrects the image data Img instead of the timing signal PTS.

In this embodiment, as illustrated in FIG. 15, corrected image data DI is stored in a storage circuit 7a of the computer 7A, besides the image data Img and discharge data DD. The corrected image data DI is data obtained by a processing circuit 7b correcting the image data Img, and includes first image data DI1 and second image data DI2. The corrected image data DI will be described in detail in the following description of a three-dimensional object printing method of this embodiment.

Figure 16:
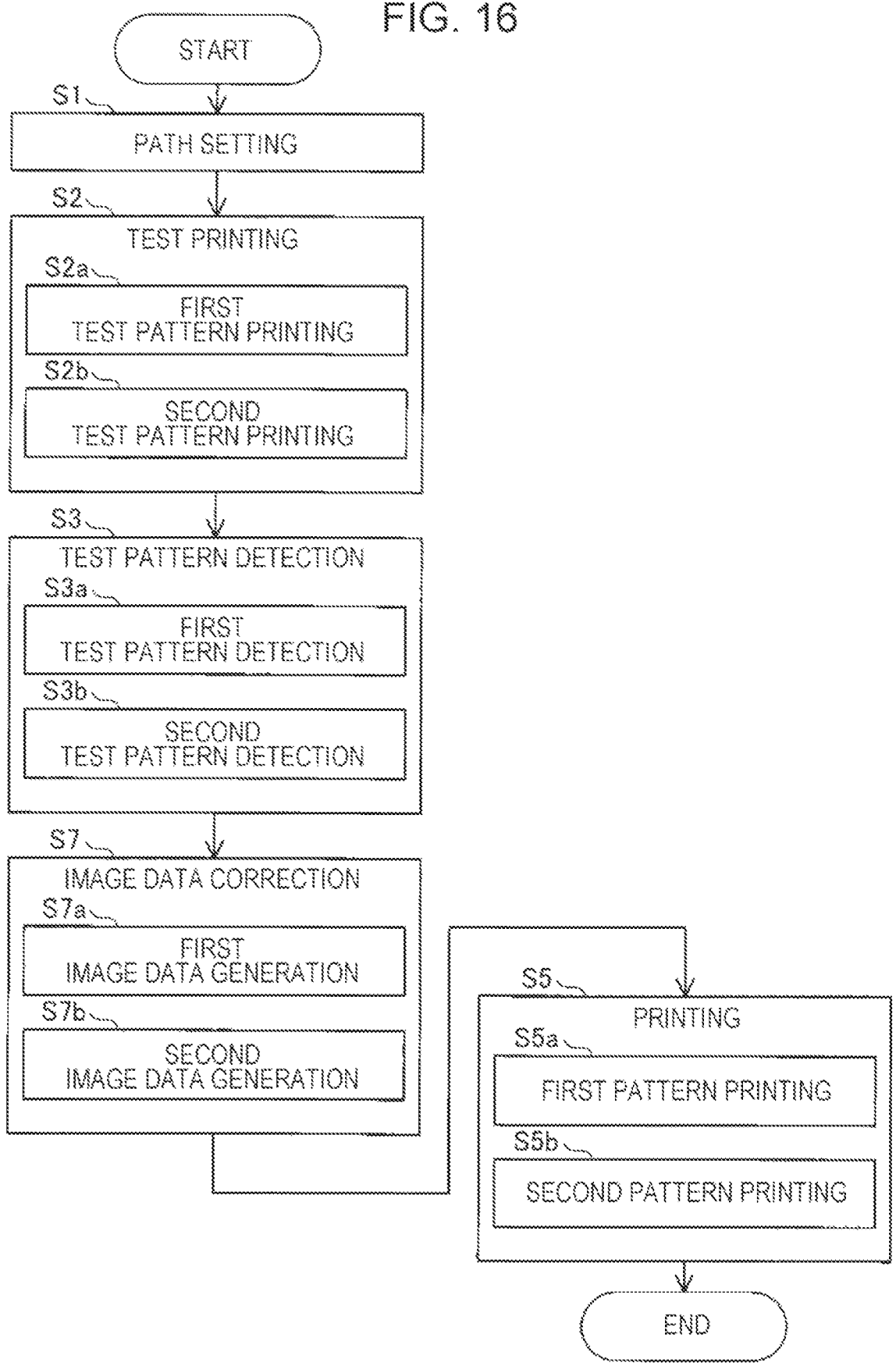
FIG. 16 is a flowchart for explaining a three-dimensional object printing method according to the third embodiment.

FIG. 16 is a flowchart for explaining the three-dimensional object printing method according to the third embodiment. The three-dimensional object printing method is the same as that of the first embodiment described above, except that step S7 of correcting image data is executed instead of step S4.

Step S7 includes step S7a of generating the first image data DI1 and step S7b of generating the second image data DI2.

In step S7a, the first image data DI1 is generated based on a detection result from step S3a of detecting a first test pattern. The first image data DI1 is image data Img obtained by correcting image data used in step S5a of printing a first print pattern, based on the detection result from step S3a.

Likewise, in step S7b, second image data DI2 is generated based on a detection result from step S1b of detecting a second test pattern. The second image data DI2 is image data Img obtained by correcting image data used in step S5b of printing a second print pattern, based on the detection result from step S1b.

According to this embodiment as described above, again, deterioration of image quality of first and second patterns can be reduced as in the first embodiment described above. In this embodiment, step S7a as an example of the "first image correction step" is executed between steps S3a and S5a. In step S7a, the first image data is corrected based on the detection result from step S3a. Then, in step S5a, the first pattern is printed based on the first image data DI1 obtained by correcting in step S7a. Likewise, step S7b as an example of the "second image correction step" is executed between steps S3b and S5b. In step S7b, the second image data is corrected based on the detection result from step S3b. Then, in step S5b, the second pattern is printed based on the second image data DI2 obtained by correcting in step S7b.

4. MODIFIED EXAMPLES

The embodiments described above may be modified in various different ways. Specific modified examples that can be applied to the above embodiments will be illustrated below. It should be noted that any two or more embodiments selected from the following examples may be appropriately combined within a range that does not contradict each other.

4-1. Modified Example 1

In the above embodiments, the description is given of the case where the first timing data DT1 is generated based on the first test pattern PT1 and the first pattern is printed based on the first timing data DT1. However, the present disclosure is not limited thereto but may also include, prior to the first pattern printing step, a confirmation step for confirming whether or not the correction value of the ink discharge timing indicated by the first timing data DT1 is appropriate. To be more specific, a test pattern is printed again based on the first timing data DT1, then the imaging device 3g takes an image of the test pattern, which is detected by the detector 7b1. When it is determined based on the detection result in the confirmation step that the correction value of the discharge timing is not appropriate, the first test printing step S2a, the first detection step S3a, and the like may be performed again. On the other hand, when it is determined based on the detection result in the confirmation step that the correction value of the discharge timing is appropriate, the first pattern can be printed based on the first timing data DT1.

The execution of the confirmation step described above makes it possible to confirm whether or not the correction value of the ink discharge timing indicated by the first timing data DT1 is appropriate before printing of the first pattern. The same confirmation step may be applied for the second timing data DT2 generated based on the second test pattern PT2.

4-2. Modified Example 2

In the above embodiments, the description is given of the configuration where the same color of ink is used in step S2a of printing the first test pattern PT1 and step S5a of printing the first pattern. However, the present disclosure is not limited to such a configuration, and different colors of ink may be used in steps S2a and S5a. That is, a first ink is used in step S2a of printing the first test pattern, and a second ink is used in step S5a of printing the first pattern. An ink having a large color difference from the workpiece W is selected as the first ink, and an ink having a smaller color difference from the workpiece W than the first ink is selected as the second ink. By selecting the ink as described above, the contrast between the first test pattern and the workpiece is increased. Therefore, the first test pattern can be accurately detected by suppressing a situation where the first test pattern cannot be detected by the imaging device 3g and the detector 7b1 in step S1b. To be more specific, in the case of a workpiece with a white or light-colored base material, black ink is preferably used for printing of the first test pattern PT1. On the other hand, in the case of a workpiece with a black or dark-colored base material, white ink and yellow ink are preferably used for printing of the first test pattern PT1.

4-3. Modified Example 3

In the above embodiments, the description is given of the configuration where the test pattern is detected based on the imaging result from the imaging device arranged in the end effector of the robot. However, the present disclosure is not limited to such a configuration, and the test pattern may be detected based on the imaging result from the imaging device having its position fixed to the base section of the robot.

4-4. Modified Example 4

In the above embodiments, the description is given of the configuration using the 6-axis vertical multiaxis robot as the robot. However, the present disclosure is not limited to such a configuration. The robot may be, for example, a vertical multiaxis robot other than the 6-axis robot, or a horizontal multiaxis robot. Also, the arm section of the robot may have a telescopic mechanism or the like, in addition to the rotating section including the rotating mechanism. However, from the viewpoint of the balance between the printing quality in the printing operation and the degree of freedom of the robot movement in the non-printing operation, it is preferable that the robot is a multiaxis robot with 6 or more axes.

4-5. Modified Example 5

In the above embodiments, the description is given of the configuration using screwing or the like as a method of fixing the head to the robot. However, the present disclosure is not limited to such a configuration. For example, the head may be fixed to the robot by gripping the head with a gripping mechanism such as a hand mounted as an end effector of the robot.

4-6. Modified Example 6

In the above embodiments, the description is given of the configuration where the robot moves the head unit. However, the present disclosure is not limited to such a configuration. For example, the position of the head unit may be fixed, and the position and posture of the head unit relative to the workpiece may be changed three-dimensionally by the robot moving the workpiece or object. In this case, the workpiece or object is gripped by a gripping mechanism such as a hand attached to the tip of the robot arm, for example.

4-7. Modified Example 7

In the above embodiments, the description is given of the configuration where printing is performed using one or two types of ink. However, the present disclosure is not limited to such a configuration but may be applied to a configuration where printing is performed using three or more types of ink.

4-8. Modified Example 8

The use application of the three-dimensional object printer according to the present disclosure is not limited to printing. For example, a three-dimensional object printer that discharges a coloring material solution is used as a manufacturing device for forming a color filter of a liquid crystal display device. A three-dimensional object printer that discharges a conductive material solution is used as a manufacturing device for forming wires and electrodes for a wiring substrate. Alternatively, the three-dimensional object printer can be used as a jet dispenser for applying a liquid such as an adhesive onto a workpiece.

What is claimed is:
1. A three-dimensional object printing method for printing on a workpiece having a three-dimensional shape by using a head unit having a first nozzle array that discharges a liquid onto the workpiece and a robot that changes a position and a posture of the head unit relative to the workpiece, the three-dimensional object printing method comprising:

a first test printing step of printing a first test pattern by the head unit discharging the liquid from the first nozzle array onto a first region of the workpiece or an object corresponding to the workpiece while the robot is changing the position of the head unit relative to the workpiece or the object;

a first detection step of detecting the first test pattern;

a correcting step of correcting liquid discharge timing based on a first detection result in the first detection step; and a first printing step of printing a first pattern by the head unit discharging the liquid from the first nozzle array onto the first region while the robot is changing the position of the head unit relative to the workpiece.

2. The three-dimensional object printing method according to claim 1, wherein an interval of a timing signal that defines an interval of discharging the liquid from the head unit does not fluctuate according to a speed of the head unit relative to the workpiece during execution of the first test printing step.

3. The three-dimensional object printing method according to claim 1, wherein an interval of a timing signal that defines an interval of discharging the liquid from the head unit is defined by a clock signal with a constant frequency.

4. The three-dimensional object printing method according to claim 1, further comprising:

a second test printing step of printing, assuming that a region of the workpiece or the object that is located at a position different from the first region in a direction along the first nozzle array in the first test printing step is a second region, a second test pattern by the head unit discharging the liquid from the first nozzle array onto the second region while the robot is changing the position of the head unit relative to the workpiece or the object;

a second detection step of detecting the second test pattern; and a second printing step of printing a second pattern by the head unit discharging the liquid from the first nozzle array onto the second region based on a second detection result in the second detection step while the robot is changing the position of the head unit relative to the workpiece.

5. The three-dimensional object printing method according to claim 4, wherein the liquid is discharged from the head unit based on discharge data in the first and second printing steps, the discharge data includes first pixel data, second pixel data, third pixel data, and fourth pixel data, the first and third pixel data are data related to pixels corresponding to a same position in a scanning direction of the head unit with respect to the workpiece, the second and fourth pixel data are data related to pixels corresponding to a same position in the scanning direction of the head unit with respect to the workpiece, a first droplet based on the first pixel data and a second droplet based on the second pixel data are discharged from the first nozzle array in the first printing step, a third droplet based on the third pixel data and a fourth droplet based on the fourth pixel data are discharged from the first nozzle array in the second printing step, and a length of a period from discharge timing of the first droplet to discharge timing of the second droplet is different from a length of a period from discharge timing of the third droplet to discharge timing of the fourth droplet.

6. The three-dimensional object printing method according to claim 1, further comprising a first timing data generation step, executed between the first detection step and the first printing step, of generating first timing data based on the first detection result in the first detection step, wherein in the first printing step, a timing signal that defines the liquid discharge timing of discharging the liquid from the first nozzle array is corrected based on the first timing data.

7. The three-dimensional object printing method according to claim 6, wherein the first test pattern contains a plurality of marks, an interval between the plurality of marks is detected in the first detection step, and the first timing data is generated in the first timing data generation step based on the interval between the plurality of marks.

8. The three-dimensional object printing method according to claim 4, wherein timing of discharging the liquid from the first nozzle array in the first test printing step or the second test printing step is defined based on a reference timing signal based on a clock signal of a constant frequency.

9. The three-dimensional object printing method according to claim 1, wherein a printing density of the first test pattern is lower than a printing density of the first pattern.

10. The three-dimensional object printing method according to claim 4, further comprising:

a first image correction step, executed between the first detection step and the first printing step, of correcting first image data based on the first detection result in the first detection step; and a second image correction step, executed between the second detection step and the second printing step, of correcting second image data based on the second detection result in the second detection step, wherein the first pattern is printed, in the first printing step, based on the first image data corrected in the first image correction step, and the second pattern is printed, in the second printing step, based on the second image data corrected in the second image correction step.

11. A three-dimensional object printer comprising:

a head unit having a first nozzle array that discharges a liquid onto a workpiece having a three-dimensional shape;

a robot that changes a position and a posture of the head unit relative to the workpiece; and a detector that detects a test pattern printed on the workpiece or on an object corresponding to the workpiece, wherein the three-dimensional object printer executes a first test printing step of printing a first test pattern by the head unit discharging the liquid from the first nozzle array onto a first region of the workpiece or the object while the robot is changing the position of the head unit relative to the workpiece or the object, a first detection step of detecting the first test pattern, a correcting step of correcting liquid discharge timing based on a first detection result in the first detection step; and a first printing step of printing a first pattern by the head unit discharging the liquid from the first nozzle array onto the first region while the robot is changing the position of the head unit relative to the workpiece.

* * * * *